United States Patent
Kawamoto et al.

(10) Patent No.: US 10,345,324 B2
(45) Date of Patent: Jul. 9, 2019

(54) FLIGHT PARAMETER MEASURING APPARATUS AND FLIGHT PARAMETER MEASURING METHOD

(71) Applicant: GPRO Co., Ltd., Hyogo (JP)

(72) Inventors: Hideaki Kawamoto, Hyogo (JP); Viet Manh Do, Hanoi (VN); Hong Quan Luong, Hanoi (VN); Trung Kien Le, Hanoi (VN)

(73) Assignee: GRPO Co., Ltd., Hyogo (JP)

( * ) Notice: Subject to any disclaimer, the term of this patent is extended or adjusted under 35 U.S.C. 154(b) by 0 days.

(21) Appl. No.: 15/885,888

(22) Filed: Feb. 1, 2018

(65) Prior Publication Data

US 2018/0348249 A1    Dec. 6, 2018

(30) Foreign Application Priority Data

Jun. 2, 2017 (JP) ................... 2017-109620

(51) Int. Cl.
*G06T 7/246* (2017.01)
*G01P 3/38* (2006.01)
(Continued)

(52) U.S. Cl.
CPC ............ *G01P 3/38* (2013.01); *A63B 69/3658* (2013.01); *G01P 3/685* (2013.01); *G01S 7/4808* (2013.01);
(Continued)

(58) Field of Classification Search
CPC ........... G06T 2207/10016; G06T 17/00; G06T 19/006; G06T 7/251; G06T 2200/08;
(Continued)

(56) References Cited

U.S. PATENT DOCUMENTS 6,219,434 B1 * 4/2001 Saporetti .......... G06K 19/06037
382/100
7,324,663 B2 * 1/2008 Kiraly ................ A63B 24/0021
348/169
(Continued)

FOREIGN PATENT DOCUMENTS

| JP | 2004184236 | 7/2004 |
| JP | 2005529339 | 9/2005 |

(Continued)

OTHER PUBLICATIONS

Ijiri et al., Automatic spin measurements for pitched Baseballs via consumer-grade high-speed cameras, Feb. 22, 2017 (1st Online) [retrieved Oct. 5, 2018], Signal, Image and Video Processing, vol. 11, Issue 7,pp. 1197-1204. Retrieved from the Internet: https://link.springer.com/article/10.1007/s11760-017-1075-x.*

(Continued)

*Primary Examiner* — Andrew M Moyer
*Assistant Examiner* — Dennis Rosario
(74) *Attorney, Agent, or Firm* — Renner, Otto, Boisselle & Sklar, LLP

(57) ABSTRACT

The image capturing part 201 captures a ball in flight with a camera continuously. The image corresponding part 203 generates a first registered ball image obtained by making a size of a first ball image in a first capturing image captured first correspond to a size of a second ball image in a second capturing image captured second. The 3D model constructing part 204constructs a 3D model of the first registered ball image obtained by converting a camera coordinate system of the generated first registered ball image into a world coordinate system. The virtual rotating part 205 rotates virtually the constructed 3D model of the first registered ball image by using a rotation parameter estimated in advance and rotation matrix information. The registered image generating part 206 generates a second registered ball image in the (Continued)

camera coordinate system obtained by converting the world coordinate system of a visible surface to see from the camera in the 3D model of the first registered ball image after the rotation into the camera coordinate system. The difference calculating part 207 extracts a second compared ball image corresponding to the second registered ball image in the second ball image, and calculates a difference between the second registered ball image and the second compared ball image. The rotation parameter determining part 208 repeats the virtual rotation of the 3D model, the generation of the second registered ball image and the calculation of the difference, and determines a rotation parameter to minimize the difference as a real rotation parameter.

9 Claims, 12 Drawing Sheets

(51) Int. Cl.
*A63B 69/36* (2006.01)
*G06T 7/73* (2017.01)
*G01S 7/48* (2006.01)
*G01P 3/68* (2006.01)
*G01S 17/02* (2006.01)
*A63B 24/00* (2006.01)

(52) U.S. Cl.
CPC ............ *G01S 17/026* (2013.01); *G06T 7/248* (2017.01); *G06T 7/251* (2017.01); *G06T 7/74* (2017.01); *A63B 2024/0015* (2013.01); *A63B 2024/0034* (2013.01); *A63B 2220/05* (2013.01); *A63B 2220/31* (2013.01); *A63B 2220/807* (2013.01)

(58) Field of Classification Search
CPC . G06T 2207/30221; G06T 2207/30224; G06T 7/73; G06T 7/80; G06T 7/75; G06T 7/20; A63B 24/0021; A63B 2220/806; A63B 24/0003; A63B 2220/807; A63B 69/36; A63B 2024/0034; A63B 2220/35; A63B 69/3658; A63B 2220/05; A63B 2102/32; A63F 13/812; A63F 2300/8011; A63F 13/573
See application file for complete search history.

(56) References Cited

U.S. PATENT DOCUMENTS

| | | | | |
|---|---|---|---|---|
| 8,704,888 | B2* | 4/2014 | Nakagome | H04N 5/3532 348/135 |
| 9,171,211 | B2* | 10/2015 | Keat | G01P 3/68 |
| 9,400,924 | B2* | 7/2016 | Yu | G06K 9/00355 |
| 2013/0135466 | A1 | 5/2013 | Kim et al. | |
| 2015/0356748 | A1 | 12/2015 | Kim | |
| 2017/0039683 | A1* | 2/2017 | Yamamoto | G06F 3/04842 |
| 2018/0075592 | A1* | 3/2018 | White | G06T 7/002 |

FOREIGN PATENT DOCUMENTS

| | | |
|---|---|---|
| JP | 2005291824 | 10/2005 |
| JP | 2016503893 | 2/2016 |
| JP | 2016507283 | 3/2016 |
| JP | 2016540185 | 12/2016 |
| JP | 6236600 B1 * | 11/2017 |
| WO | 2003104838 | 12/2003 |
| WO | 2014109546 | 7/2014 |
| WO | 2016163293 | 10/2016 |

OTHER PUBLICATIONS

Machine translation of JP 6236600 B1, 23 pages total.*
Zhai et al., Characterization of Particle Size Distribution (PSD) Evolution during Flocculation by an Image Acquisition and Analysis System, Jul. 4-5, 2009 [retrieved Mar. 28, 2019], 2009 Inter Conf Envir Sci and Info Appl Tech,pp. 362-366. Retri: https://ieeexplore.ieee.org/abstract/document/5199710 (Year: 2009).*
Liang et al., A Scheme for Ball Detection and Tracking in Broadcast Soccer Video, 2005 (retrieved Mar. 28, 2019), LNCS: Pacific-Rim Conference on Multimedia: Advances in Multimedia Information Processing,vol. 3767, pp. 864-875. Retrieved: https://link.springer.com/chapter/10.1007/11581772_76#citeas (Year: 2005).*
Translation of Japanese Office Action dated Aug. 17, 2017, Notice of Reasons for Rejection, Japan Patent Application No. 2017-109620.
Edwin H. Land; "The Retinex Theory of Color Vision"; Scientific American; vol. 237, No. 6; Dec. 1977.
Provenzi et al.; "Mathematical definition and analysis of the Retinex algorithm"; Optical Society of America; vol. 22, No. 12; Dec. 2005.
Jobson et al.; Properties and Performance of a Center/Surround Retinex; IEE Transactions on Image Processing; vol. 6, No. 3; Mar. 1997.
Hartley et al.; "Multiple View Geometry in computer vision"; Cambridge University Press; 2004.

* cited by examiner

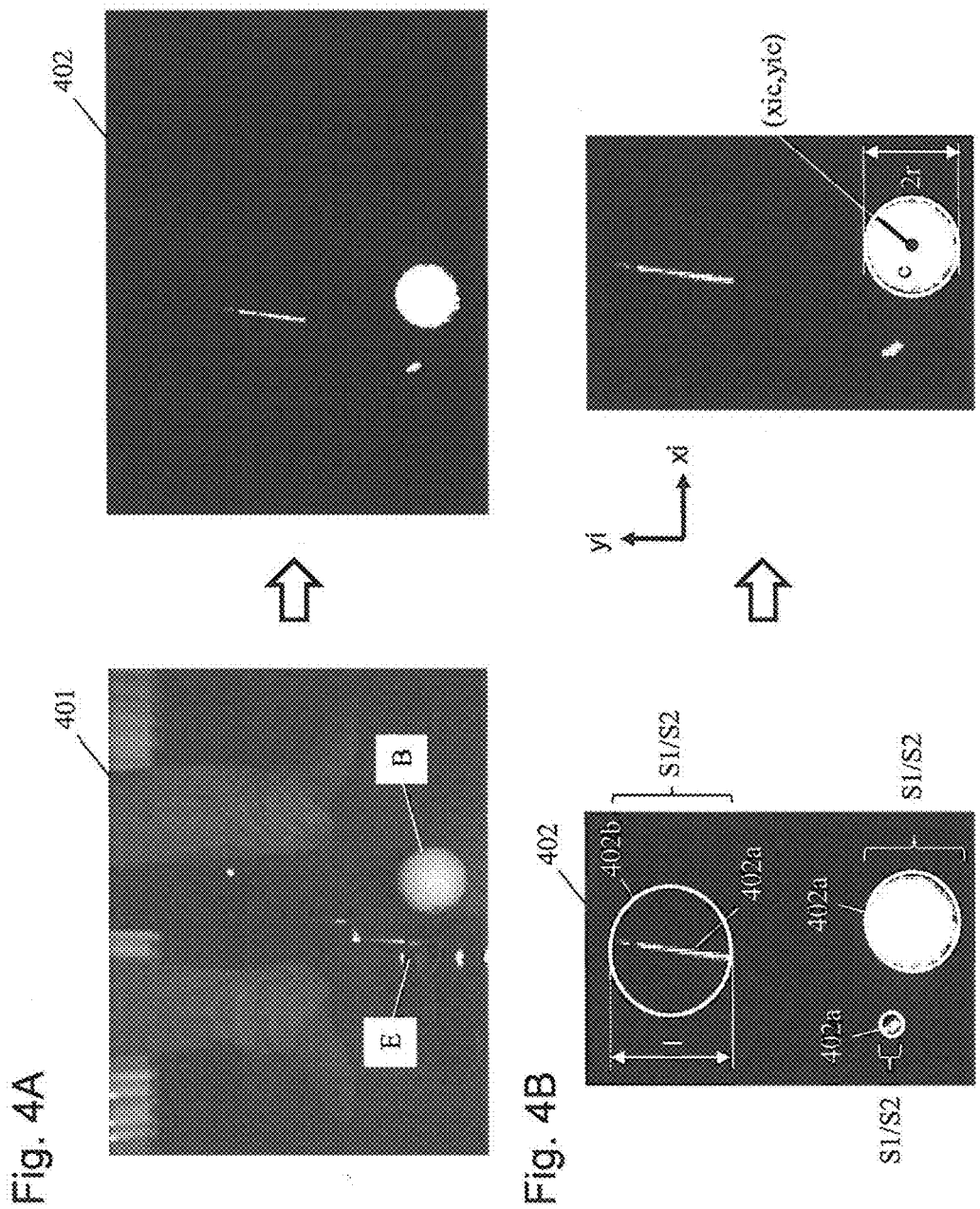

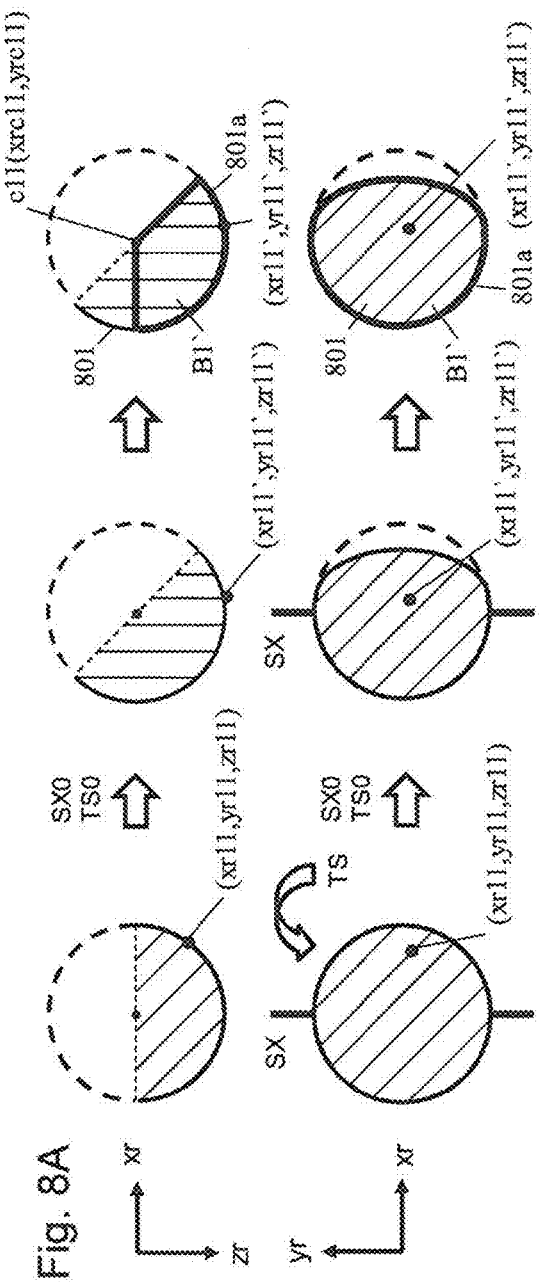
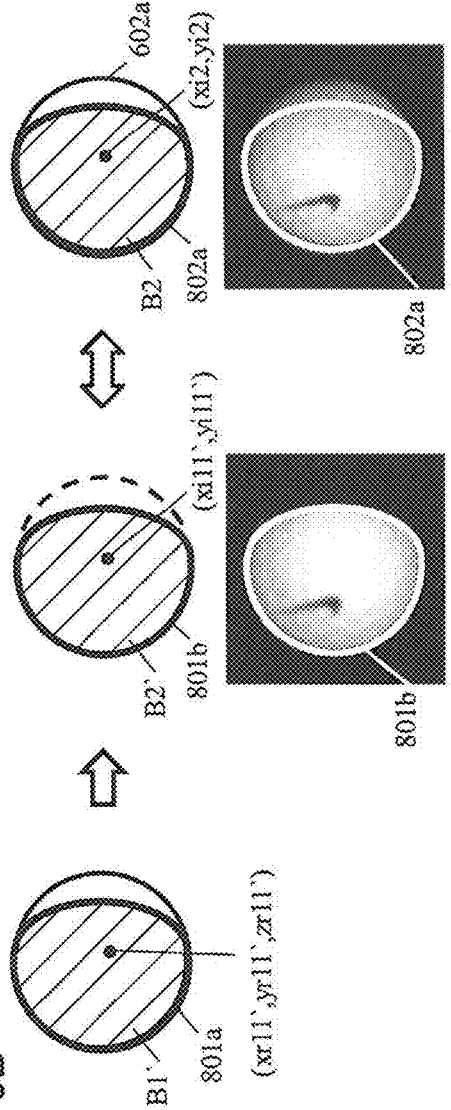
Fig. 8A
Fig. 8B

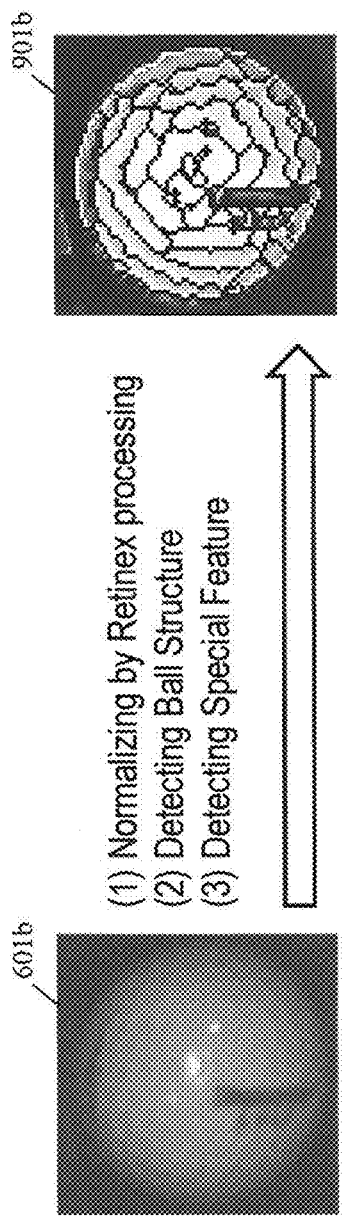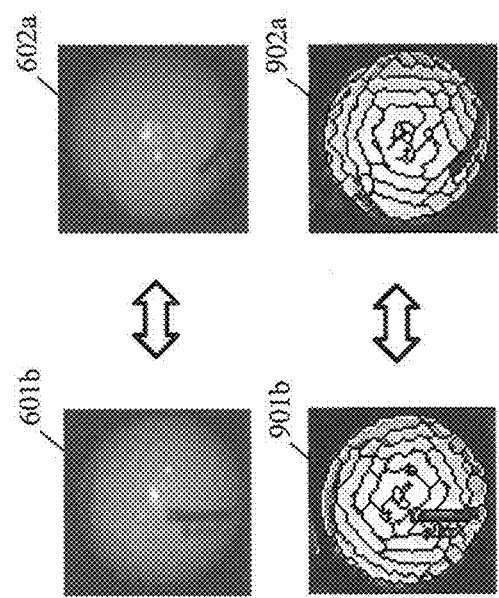
Fig. 9A
Fig. 9B

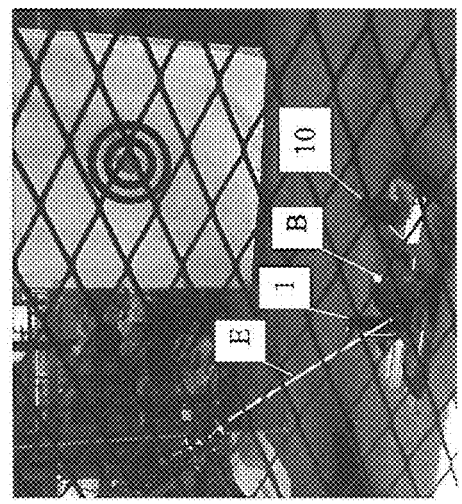
Fig. 10A
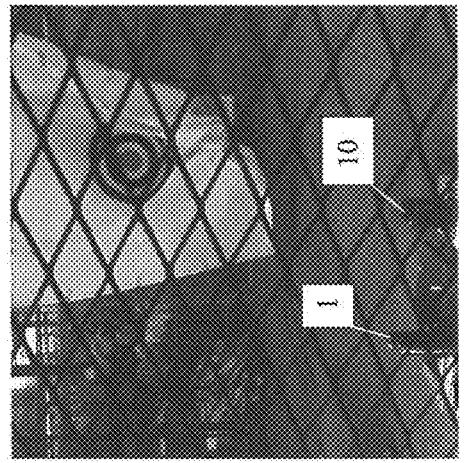
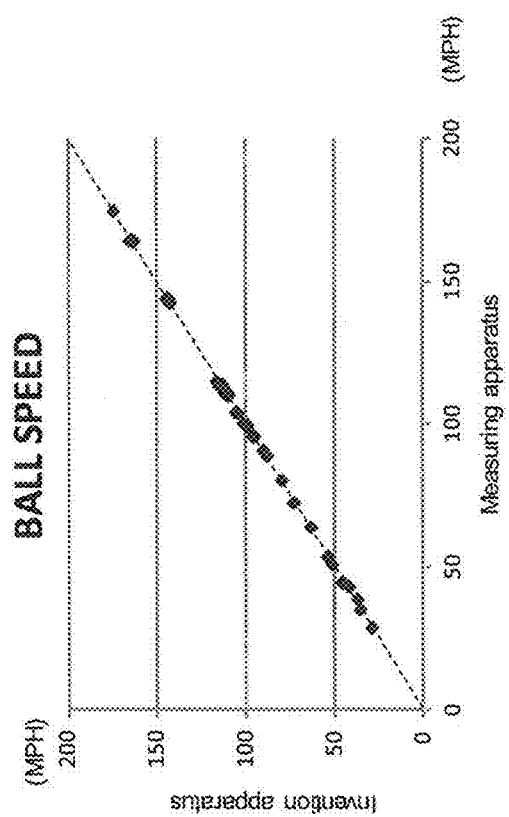
Fig. 10B

FLIGHT PARAMETER MEASURING APPARATUS AND FLIGHT PARAMETER MEASURING METHOD

This application claims priority to Japanese Patent Application No. JP2017-109620 Jun. 2, 2017, in the Japan Patent Office, which is hereby incorporated herein by reference.

TECHNICAL FIELD

The present invention relates to a flight parameter measuring apparatus and a flight parameter measuring method.

BACKGROUND ART

Traditionally, techniques for measuring the flight parameters (launch parameters) of the ball, such as a golf ball exist a lot. For example, Patent Literature 1 discloses a method of measuring launch parameters of an object in flight. The method comprises capturing a plurality of images of an object in flight, identifying a radius of the object and a center of the object in each of the plurality of images, and calculating a velocity, an elevation angle, and an azimuth angle based on the radius of the object, the center of the object, and pre-measured camera alignment values. Further, the method comprises cropping the plurality of images to a smallest square that bounds the object, flattening the plurality of images from spherical representations to Cartesian representations, converting the Cartesian representations to polar coordinates with a range of candidate centers of rotation, and based on a fit of the polar image pair, measuring the spin axis and spin rate.

Patent Literature 2 discloses a method for determining parameters of an object in motion. The method comprises the steps of calibrating a camera lens to establish (x, y, z) directions for every (x, y) pixel in an image plane of the camera, determining alignment correction factors, capturing a plurality of images of the object in motion, finding the object in each of the plurality of images, calculating three dimensional coordinates for each of the plurality of images, and calculating a velocity vector for the object from the three dimensional coordinates. Further, the method comprises the steps of rotating a reference image of the plurality of images by a first set of rotations of a plurality of rotation sets, scaling the rotated reference image to a target image, correlating the reference image to the target image to obtain an incremental score of a plurality of scores, repeating the steps of rotating, scaling and correlating in a stepwise refinement manner to obtain a best score of the plurality of scores and utilizing a best rotation set of the plurality of rotation sets to determine the parameters of the object in motion.

CITATION LIST

Patent Literature

[Patent Literature 1]
Japanese Unexamined Patent Application Publication (Translation of PCT Application) No. 2016-540185
[Patent Literature 2]
Japanese Unexamined Patent Application Publication (Translation of PCT Application) No. 2005-529339

SUMMARY OF INVENTION

Technical Problem

When flight parameters of a ball are calculated based on a ball image photographed with a camera, various image processing methods exist, and an effective method is exploring (unknown), in the mentioned Patent Literature 1 and 2, it is a problem that there are many processes (steps) required for a measurement of the flight parameters, are complicated, and a processing capacity and a processing time are necessary. And, an accuracy of the measured flight parameters is unknown. Here, the flight parameters usually include a motion parameter to mean a ball speed, a launch angle and a side angle of an object in motion, and a rotation parameter to mean a spin axis and a total spin of the object, but it is very hard to calculate the rotation parameter accurately.

Accordingly, the present invention was created as a solution for the problems and aims at providing a flight parameter measuring apparatus and a flight parameter measuring method that can measure accurately the flight parameters of the ball by a simple image processing method.

Solution to Problem

A flight parameter measuring apparatus in the present invention comprises an image capturing part, an image corresponding part, a 3D model constructing part, a virtual rotating part, a registered image generating part, a difference calculating part, and a rotation parameter determining part. The image capturing part captures a ball in flight with a camera continuously. The image corresponding part generates a first registered ball image obtained by making a size of a first ball image in a first capturing image captured first correspond to a size of a second ball image in a second capturing image captured second. The 3D model constructing part constructs a 3D model of the first registered ball image obtained by converting a camera coordinate system of the generated first registered ball image into a world coordinate system of the generated first registered ball image. The virtual rotating part rotates virtually the constructed 3D model of the first registered ball image by using a rotation parameter estimated in advance and rotation matrix information. The registered image generating part generates a second registered ball image in the camera coordinate system obtained by converting the world coordinate system of a visible surface, to see from the viewpoint of the camera, in the 3D model of the first registered ball image after the rotation into the camera coordinate system of the visible surface. The difference calculating part extracts a second compared ball image corresponding to the second registered ball image in the second ball image, and calculates a difference between the second registered ball image and the second compared ball image. The rotation parameter determining part repeats the virtual rotation of the 3D model, the generation of the second registered ball image, and the calculation of the difference, and determines a rotation parameter to minimize the difference as a real rotation parameter.

A flight parameter measuring method in the present invention comprises an image capturing step, an image corresponding step, a 3D model constructing step, a virtual rotating step, a registered image generating step, a difference calculating step, and a rotation parameter determining step like each part of the flight parameter measuring apparatus.

Advantageous Effects of Invention

According to the present invention, the present invention can measure accurately the flight parameters of the ball by a simple image processing method.

BRIEF DESCRIPTION OF DRAWINGS

FIG. 4A is an example of a capturing image and a binarizing image.

FIG. 4B is an example of an extraction of an object in the binarizing image and a calculation of center coordinates and a radius of a ball in the binarizing image.

FIG. 8A is the outline diagram when a visible surface of the first registered ball image after a rotation is extracted by rotating the 3D model of the first registered ball image virtually.

FIG. 8B is the outline diagram when a difference between a second registered ball image and a second compared ball image is calculated.

FIG. 9A is an example of a re-constituting of the ball image by Retinex processing, binarization processing, and patch binarization processing.

FIG. 9B is the outline diagram indicating a difference between the second registered ball image and the second compared ball image depending on the presence of the re-constituting of the ball image.

FIG. 10A is an example of a photograph image indicating the state when flight parameters of a golf ball launched by a robot for golf are measured.

FIG. 10B is a graph of a measurement result of ball speeds of the golf ball by using a commercial flight parameter measuring apparatus and the flight parameter measuring apparatus according to the present invention.

DESCRIPTION OF EMBODIMENTS

The preferred embodiments of the present invention will be explained below according to the attached drawings; thereby the present invention will he clearly understood. The embodiments below are examples materializing the present invention, and do not limit the technical scope of the present invention.

Figure 1:
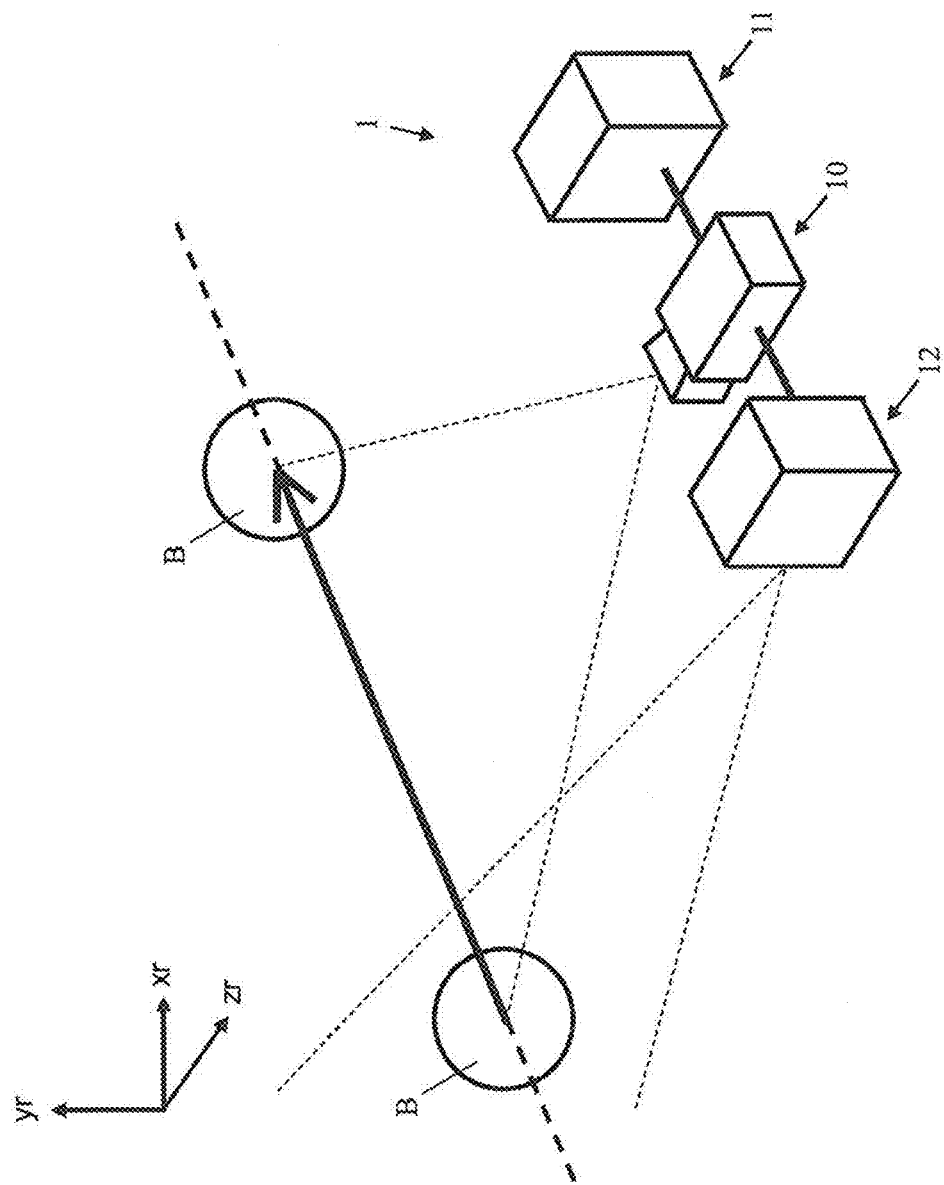
FIG. 1 is the outline diagram indicating the flight parameter measuring apparatus according to the present invention.

As shown in FIG. 1, a flight parameter measuring apparatus 1 in the present invention includes a camera 10 and a flight parameter calculating part 11. The camera 10 is a high-speed camera enabling to capture image continuously at high speed in a short time. If the camera 10 in the present invention can acquire capturing image appropriately, the number of the camera 10 is not particularly limited, one or more (e.g., two) cameras may be used. The flight parameter measuring apparatus 1 starts a capturing of the camera 10 at the moment when a ball in flight enters in the view of the camera 10 and captures the ball B moving (flying or launching) in the view continuously at high speed for a predetermined time.

The flight parameter calculating part 11 is communicably connected with the camera 10, when receiving plural (e.g., two) capturing images including the ball B captured by the camera 10, calculates a flight parameter of the ball B in motion based on the plural capturing images. The flight parameter comprises of a motion parameter and a rotation parameter. The motion parameter means a speed (BALL SPEED) of ball B, a launch angle (LAUNCH ANGLE) and a side angle (SIDE ANGLE). The rotation parameter means a spin axis (SPIN AXIS) and a total spin (TOTAL SPIN). In addition, a backspin means a spin in the opposite direction to the flying direction of the ball B and a sidespin means a spin in the lateral direction to the spin axis. It is possible to calculate the backspin and the sidespin from the speed of ball B, the launch angle, the side angle, the spin axis and the total spin.

Here, to capture the ball B in motion in the view of the camera 10 timely, the flight parameter measuring apparatus 1 further includes a ball detecting part 12. The constitution of the ball detecting part 12 is not particularly limited. For example, the ball detecting part 12 comprises an infrared ray irradiating part to irradiate with an infrared ray in the view (e.g., in vicinity of end part of the view) of the camera 10, an infrared ray receiving part to receive the irradiated infrared ray as a reflected light and a reflected light detecting part to detect entering of the ball B in motion in the view of camera 10 based on a change of the received reflected light. When the ball B enters in the view, the infrared ray in the view reflects with the ball B and the reflected light of the ball B changes. Therefore, the ball detecting part 12 uses the phenomenon and detects entering of the ball B into the view of the camera 10. The infrared ray irradiating part and the infrared ray receiving part are one set. By comprising plural sets serially for the horizontal direction in the view of the camera 10, it is possible to detect accurately where the ball B enters in the view of the camera 10. In addition, a laser beam or a laser curtain may be used replacing with the infrared ray. When detecting the ball B in motion in the view of the camera 10, the ball detecting part 12 sends a defection signal to the flight parameter calculating part 11, the flight parameter calculating part 11 inputs a capture signal into the camera 10 and captures the ball B in motion in the view of the camera 10 continuously.

In addition, the camera 10, the flight parameter calculating part 11 and the ball detecting part 12 are built from a CPU, ROM, RAM and the like not shown, and for example, CPU uses RAM as a working area and executes program stored in ROM and the like. About the below respective parts, CPU executes the program for materializing the respective parts.

Figure 2:
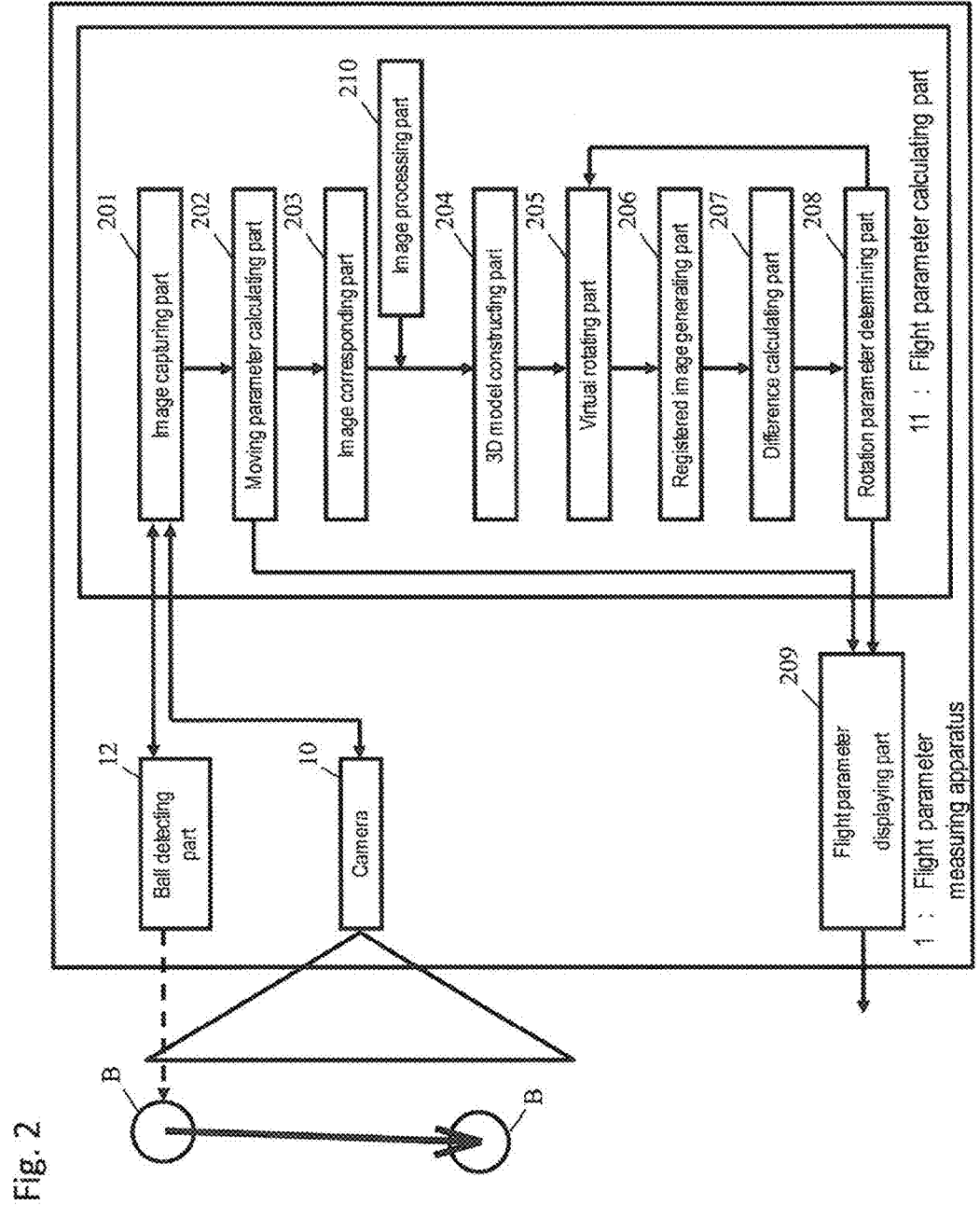
FIG. 2 is the functional block diagram indicating the flight parameter measuring apparatus according to the present invention.
Figure 3:
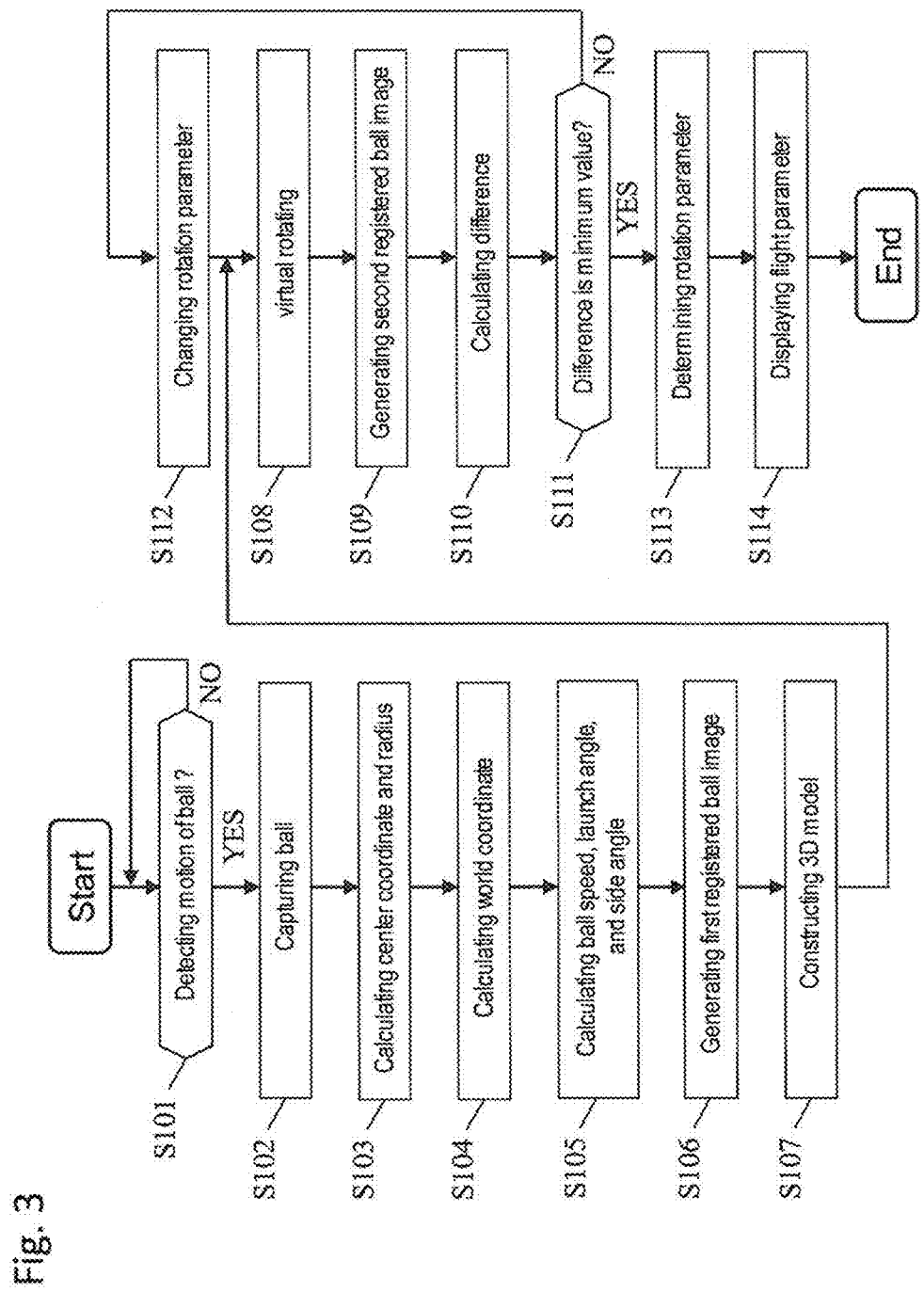
FIG. 3 is the flowchart indicating execution steps of the flight parameter measuring apparatus according to the present invention.

As referring to FIG. 2, FIG. 3, the constitution and the execution steps in the embodiment of the present invention are explained. First, when the user (player) turns on a power supply of the flight parameter measuring apparatus 1, the flight parameter measuring apparatus 1 starts and the ball detecting part 12 starts a detection of a motion of a ball B (FIG. 3, S101).

The player places a ball B (e.g., a golf ball) beside the flight parameter measuring apparatus 1, when the player launches the ball B with a golf club E (FIG. 4A), the ball detecting part 12 defects a flight (launch) of the ball B (FIG. 3, S101YES). Then, an image capturing part 201 of the flight parameter measuring apparatus 1 captures a ball B in flight with a camera 10 continuously (FIG. 3, S102). Here, the image capturing part 201 captures the flying ball B with camera 10 continuously at high speed for a predetermined time and gets two capturing images.

When the image capturing part 201 finishes capturing, a motion parameter calculating part 202 of the flight parameter measuring apparatus 1 calculates a motion parameter of the ball B based on a first ball image of a first capturing image captured first and a second ball image of a second capturing image captured next.

The method that the motion parameter calculating part 202 calculates is not particularly limited. At first, the motion parameter calculating part 202 calculates center coordinates (center coordinate values) and a radius of the ball image for each of the first capturing image and the second capturing image (FIG. 3, S103). Specifically, as shown in FIG. 4A, the motion parameter calculating part 202 binarizes (performs binarization processing) the first capturing image 401 and generates a binarizing image 402 to specify an outer edge (outline) of an object in the first capturing image 401. The object specified by the binarizing image 402 mainly has a sufficient density difference than the peripheral area.

When the first capturing image 401 is a full color image, the motion parameter calculating part 202 converts the first capturing image 401 into a gray scale image expressing a pixel value (density value) of a pixel with 256 values, converts the pixel, whose pixel value being a predetermined threshold or more than the threshold, into "1" (white), converts the pixel, whose pixel value being less than the threshold, into "0" (black) and generates the binarizing image 402 by the conversion. The threshold is predetermined to make an outer edge of the ball B in capturing image clear.

Here, it is possible to include an object (e.g., an edge of golf club E) except the ball B among the objects each specified with an outer edge. Then, as shown in FIG. 4A, the motion parameter calculating part 202 calculates a long side I of each object 402a for respective plural objects 402a specified each outer edge in the binarizing image 402, calculates an area S1 of each circle 402b, whose calculated long side I being a diameter and an area S2 in each outer edge of each object 402a and calculates area ratios S1/S2 obtained by dividing the area S1 of each circle 402b by the area S2 in each outer edge of each object 402a. And, the motion parameter calculating part 202 specifies the object 402a having the area ratio S1/S2 being the nearest to 1 (−) among the calculated area ratios S1/S2 of the plural objects 402a as the ball B. Namely, the area ratio S1/S2 being the nearest to 1 (−) means that the area S1 of the circle 402b making the long side I the diameter is equal to the area S2 in the outer edge of the object 402a and the object 402a is a circle. In this way, it is possible to specify only ball B in the binarizing image 402 definitely.

And, the motion parameter calculating part 202 calculates a center coordinates c and a radius r of the specified ball B in the binarizing image 402. The center coordinates c of the ball B is calculated as two-dimensional coordinates (xic, yic) (pixel) of the binarizing image 402 in a camera coordinate system (an image coordinate system. The camera coordinate system is a coordinate system that has an origin at a center of the capturing image 401 (or the binarizing image 402), has a horizontal axis at a x-axis (xi) and has a vertical axis at a y-axis (yi). The radius r of the ball B is calculated as a pixel number (pixel). When finishing calculating the center coordinates c and the radius r of the first ball B in the first capturing image 401, the motion parameter calculating part 202 calculates a center coordinates c and a radius r of the second ball B in the second capturing image by processing similar to that of the above for the second capturing image.

Next, the motion parameter calculating part 202 calculates a center coordinates c in a world coordinate system (an actual coordinate system) based on the calculated center coordinates c and the calculated radius r of the ball B and information concerning a calibration of the camera 10 for each of the first capturing image and the second capturing image (FIG. 3, S104).

Figures 5A, 5B:
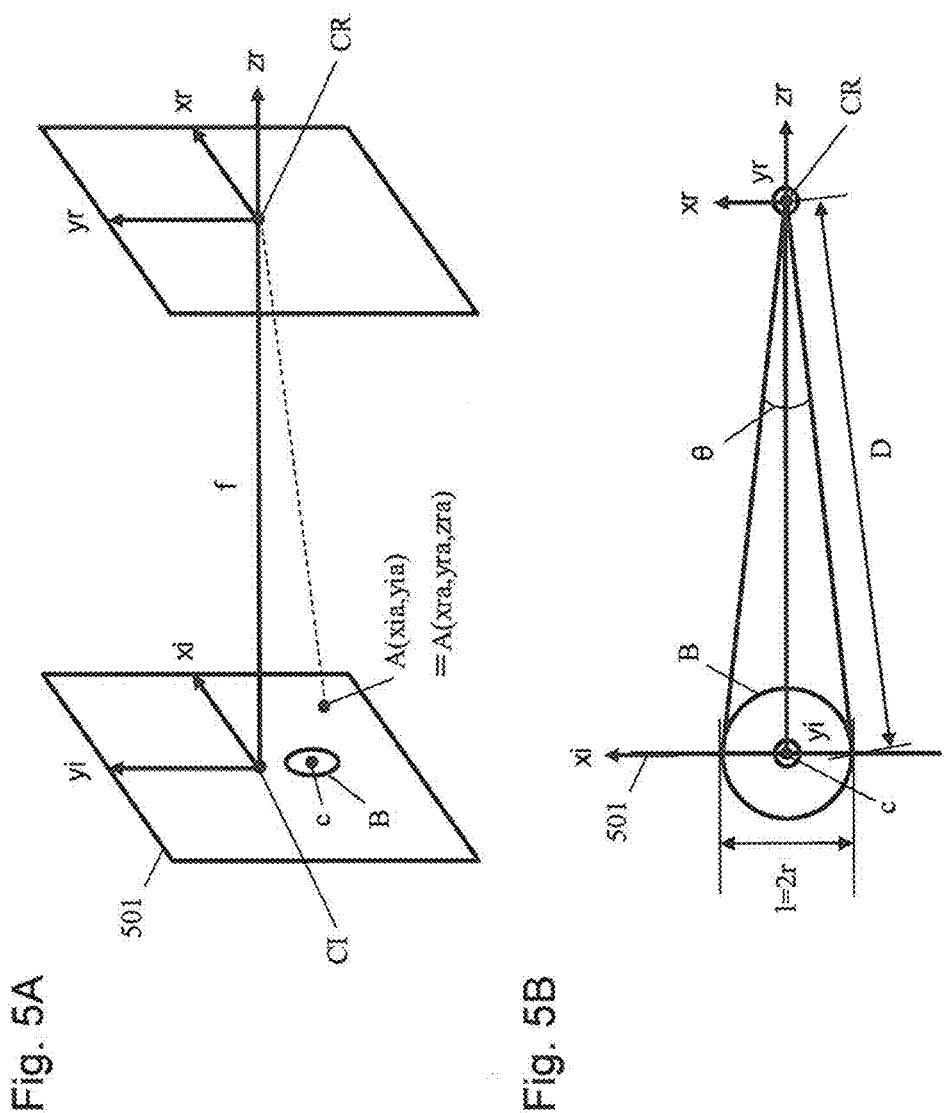
FIG. 5A is the outline diagram indicating a relation between a camera coordinate system of the capturing image and a world coordinate system of the camera.
FIG. 5B is the outline diagram when a z coordinate of the world coordinate system of the ball is calculated.

The method that the motion parameter calculating part 202 calculates is not particularly limited. Here, the information concerning the calibration of the camera 10 means calibration matrix information. As shown in FIG. 5A, the calibration matrix information associates two-dimensional coordinates (xia, yia) (pixel) of an arbitrary point A on a capturing image 501 of the camera coordinate system having the origin at a center CI of the capturing image 501 corresponding to a focal distance f (length) of the camera 10 with three-dimensional coordinates (xra, yra, zra) (length) of the arbitrary point A on the world coordinate system having the origin at a center CR of the camera 10, for example, the calibration matrix information can be a K matrix information, P matrix information and the like. And the capturing image 501 is located vertically for a z-axis at a position separated at the focal distance f (length) towards a capturing object in the z-axis direction from the center CR of the camera 10. The world coordinate system is a coordinate system that has an origin at the center CR of the camera 10, has a horizontal axis at a x-axis (xr), has a vertical axis at a y-axis (yr) and has a depth axis (a viewing axis or an optical axis) at a z-axis (zr).

The motion parameter calculating part 202 converts the camera coordinate system {two-dimensional coordinates (xic, yic)} of the center coordinates c of the calculated ball B into the world coordinate system {three-dimensional coordinates (xrc, yrc, zrc)} with using the calibration matrix information.

Here, the z coordinate value in the three-dimensional coordinates (xrc, yrc, zrc) of the world coordinate system calculated by the calibration matrix information is a z coordinate value of the arbitrary point A on the capturing image 501, so all of the z coordinate value of the arbitrary points A on the capturing image 501 are of a same value. Then, the z coordinate value of the world coordinate system of the ball B flying in the z-axis direction needs to be calculated by a different method.

Therefore, the motion parameter calculating part 202 calculates a z coordinate value of the world coordinate system of the ball B based on a relationship with the calculated radius r of the ball B and the angle θ between both right and left ends of the ball B of the capturing image 501 in the z-axis direction on the basis of the center CR of the camera 10 of the world coordinate system with using Law of cosines. As shown in FIG. 5B, by the following formulas (1) and (2), the Law of cosines is established among a distance I of the both right and left ends of the ball 6 of the capturing image 501, a distance I corresponding to the diameter 2r of the ball B, a distance D between the left end (or the right end) of the ball B of the capturing image 501 and the center CR of the camera 10 of the world coordinate system and an angle θ between the both right and left ends of the ball B of the capturing image 501 in the z-axis direction on the basis of the center CR of the camera 10 of the world coordinate system.

$$Isup2 = Dsup2 + Dsup2 - 2*D*\cos\theta = 2Dsup2*(1-\cos\theta) \quad (1)$$

$$D = SQR\{Isup2/(2*(1-\cos\theta))\} \quad (2)$$

The motion parameter calculating part 202 converts a pixel of the radius r of the ball B into a length with using a previously calculated scale to convert a length (real size) from a pixel, calculates the diameter I (=2r) (length) of the ball B from the converted radius r (length) of the ball B, calculates the angle θ (degree) between the both right and left ends of the ball B of the capturing image 501 in the z-axis direction from the focal distance f (length) of the camera 10 and the diameter I (length) of the ball B, and calculates the distance D (length) obtained by substituting the diameter I (length) of the ball B and the angle θ (degree) for the above formula (2). Here, the distance D (length) is approximated to the z coordinate value of the world coordinate system of the ball B, so the motion parameter calculating part 202 estimates the calculated distance D (length) in the z coordinate value of the world coordinate system of the ball B. In addition, the above processing is carried out for each of the first ball and the second ball.

And, the motion parameter calculating part 202 calculates a motion parameter (ball speed BS, launch angle LA and side angle SA) of the ball B based on the calculated center coordinates c {three-dimensional coordinates (xrcj, yrcj, zrcj) (j=1,2)} of the first ball and the second ball and an interval of the capturing time of the first ball and the second ball (FIG. 3, S105).

Figure 6A:
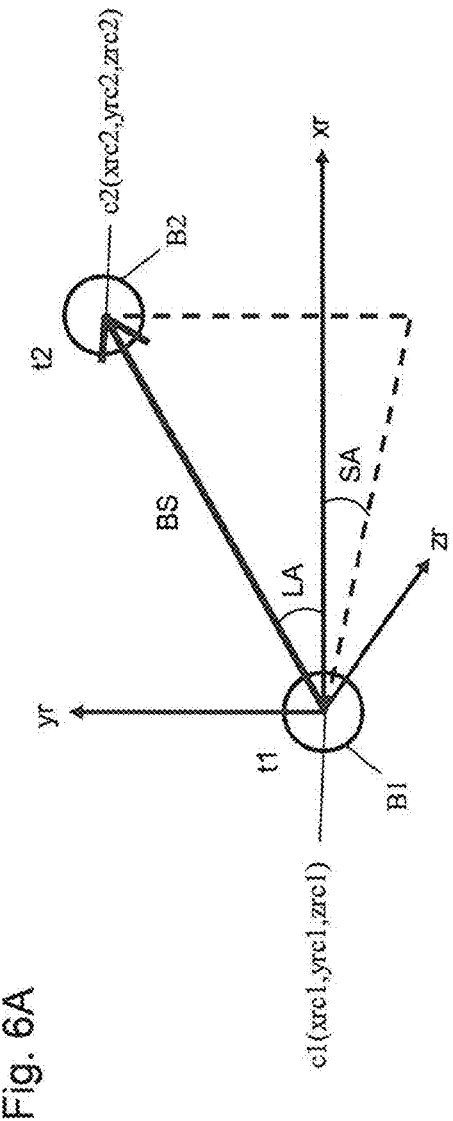
FIG. 6A is the outline diagram indicating a relation among a ball speed, a launch angle and a side angle of the ball.

The method that the motion parameter calculating part 202 calculates is not particularly limited. As shown in FIG. 6A, the ball speed BS, the launch angle LA and the side angle SA can be calculated based on the center coordinates c1 {three-dimensional coordinates (xrc1, yrc1, zrc1)} of the first ball B1 of the first capturing image in the world coordinate system, the center coordinates c2 {three-dimensional coordinates (xrc2, yrc2, zrc2)} of the second ball B2 of the second capturing image, the first time t1 (sec) when the first capturing image 401 is captured and the second time t2 (sec) when the second capturing image 401 is captured.

Concretely, the motion parameter calculating part 202 calculates speeds (Vx, Vy, Vz) of the ball B on each axis in the world coordinate system by substituting the above value for the following formulas (3) (4) (5) and (6) and calculates a total speed BS of the ball B.

$$Vx = (xrc2 - xrc1)/(t2-t1) \quad (3)$$

$$Vy = (yrc2 - yrc1)/(t2-t1) \quad (4)$$

$$Vz = (zrc2 - zrc1)/(t2-t1) \quad (5)$$

$$BS = SQR(Vxsup2 + Vysup2 + Vzsup2) \quad (6)$$

And, the motion parameter calculating part 202 calculates a launch angle LA and a side angle SA in the world coordinate system by substituting the calculated speeds (Vx, Vy, Vz) of the ball B on each axis for the following formulas (7) and (8). In addition, PI means the circular constant.

$$LA = 180*\{\tan sup(-1)(Vy/Vx)/PI\} \quad (7)$$

$$SA = 180*\{\tan sup(-1)(Vz/Vx)/PI\} \quad (8)$$

After the motion parameter calculating part 202 finishes capturing the motion parameter of the ball B, then, a rotation parameter of the ball B is carried out. First, an image corresponding part 203 of the flight parameter measuring apparatus 1 generates the first registered ball image obtained by making the first ball image in the first capturing image correspond to the second ball image in the second capturing image (FIG. 3, S106).

Figure 6B:
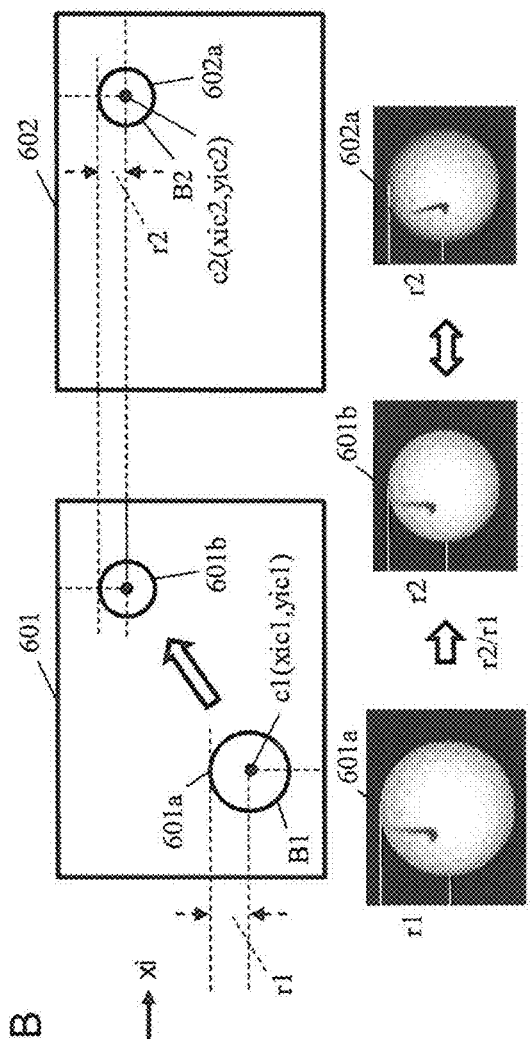
FIG. 6B is the outline diagram when a first ball image is corresponded to a second ball image in the camera coordinate system.

The method that the image corresponding part 203 generates is not particularly limited. As shown in FIG. 6B, at first the image corresponding part 203 corresponds a position of the first ball image 601a to a position of the second ball image 602a by translating the center coordinates c1 (xic1, yic1) of the first ball B1 in the camera coordinate system to the center coordinates c2 (xic2, yic2) of the second ball B2 of the second capturing image 602 (in the camera coordinate system).

Next, the image corresponding part 203 calculates a size ratio r2/r1 obtained by dividing a radius r2 (pixel) of the second ball B2 by a radius r1 (pixel) of the first ball B1, multiplies the size ratio r2/r1 (−) by the first ball image 601a of the first ball B1 and generates the first registered ball image 601b obtained by making a size of the first ball image 601a correspond to a size of the second ball image 602a. The first registered ball image 601b is the image to adjust a viewpoint of the first ball B1 to a viewpoint of the second ball B2. When the ball B is rotated, the first ball image 601a is an image before the rotation, the second ball image 602a is an image after the rotation and the surface (mapped points) of the both are different.

In addition, when generating the first registered ball image 601b, the image corresponding part 203 may calculate correspondence coordinates (xi11, yi11) of the first registered ball image 601b corresponding to arbitrary coordinates of the second ball image 602a with using the center coordinates c1 (xic1, yic1) of the first ball image 601a, the arbitrary coordinates (xi2, yi2) of the second ball image 602a and the center coordinates c2 (xic2, yic2) of the second ball image 602a in the camera coordinate system, the size ratio r2/r1 and the following formulas (9) and (10).

$$xi11 = (xi2 - xic2)*r2/r1 + xic1 \quad (9)$$

$$yi11 = (yi2 - yic2)*r2/r1 + yic1 \quad (10)$$

Figure 7A:
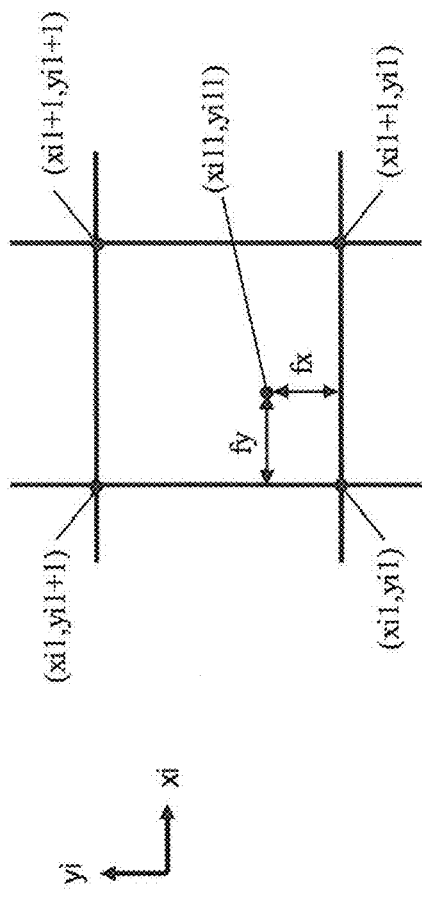
FIG. 7A is the outline diagram when a pixel value of a pixel of a first registered ball image.

Here, a pixel comprising the first ball image 601a associates 2D coordinates (xi1, yi1) (pixel) in the camera coordinate system with a pixel value indicating a gray value, the unit of the pixel of the camera coordinate system is different from the unit of the pixel of the image with the size ratio r2/r1, and does not have a decimal. Therefore, when the position and the size of the first ball image 601a is corresponded to the position and the size of the second ball image 602a, as shown in FIG. 7A, it is a possibility to deviate the arbitrary coordinates (xi11, yi11) of the pixel of the first registered ball image 601b in the camera coordinate system from the arbitrary coordinates (xi1, yi1) of the pixel of the first ball image 601a (in the camera coordinate system).

Then, the image corresponding part 203 estimates (interpolates) a pixel value of a target pixel of the first registered ball image 601b based on pixel values of respective four pixels (peripheral pixels or closer pixels) of the first ball image 601*a*, the four pixels arranged adjacently to four ends of the target pixel of the first registered ball image 601*b*. In this way, it is possible to dissolve a shift between the pixel value of the pixel of the first registered ball image 601*b* and the pixel value of the pixel of the first ball image 601*a*, and to calculate the rotation parameter accurately.

Concretely, the image corresponding part 203 estimates a pixel value I (xi11, yi11) {in arbitrary coordinates (xi11, yi11) of the camera coordinate system} of the target pixel of the first registered ball image 601*b* by substituting pixel values I (xi1, yi1), I (xi1+1, yi1), I (xi1+1, yi1+1) and I (xi1, yi1+1) of the peripheral pixels of the first ball image 601*a*, the peripheral pixels arranged adjacently to the four ends of the target pixel of the first registered ball image 601*b* for the following formulas (11), (12) and (13).

$$I(xi11, yi11)=I(xi1, yi1)*(1-fx)*(1-fy)+I(xi1+1, yi1)*(1-fx)*fy+I(xi1+1, yi1+1)*fx*fy+I(xi1, yi1+1)*fx*(1-fy) \quad (11)$$

$$fx=xi11-xi1 \quad (12)$$

$$fy=yi11-yi1 \quad (13)$$

When the image corresponding part 203 finishes generating, a 3D model constructing part 204 of the flight parameter measuring apparatus 1 constructs a 3D model of the first registered ball image 601*b* obtained by converting the camera coordinate system of the generated first registered ball image 601*b* into the world coordinate system of the generated first registered ball image 601*b* (FIG. 3, S107).

Figure 7B:
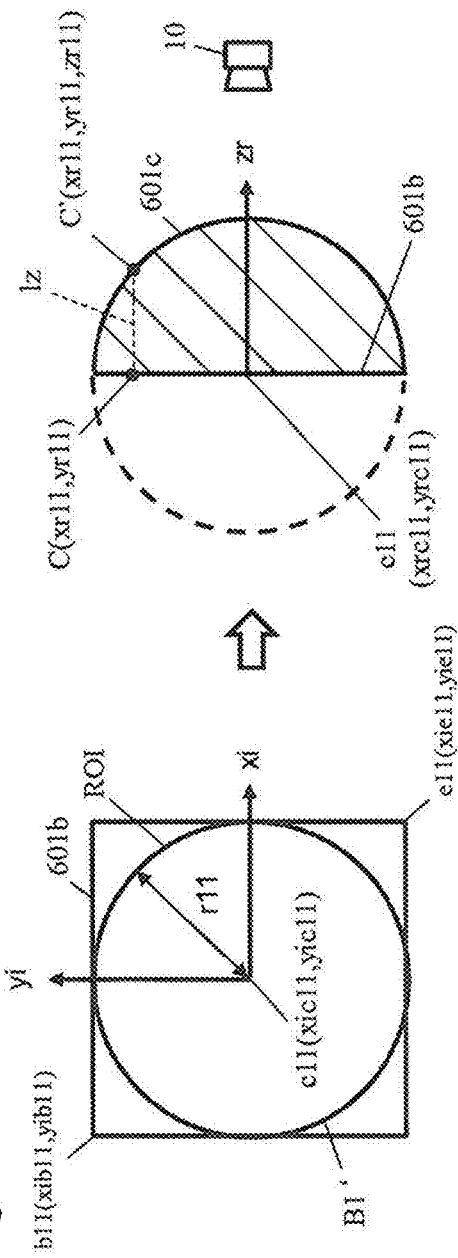
FIG. 7B is the outline diagram when a 3D model is constructed by converting the camera coordinate system of the first registered ball image into the world coordinate system of the first registered ball image.

The method that the 3D model constructing part 204 constructs is not particularly limited. At first, as shown in FIG. 7B, the 3D model constructing part 204 extracts only the first registered ball image 601*b* as a ROI (Region of Interest: interest domain) image with using center coordinates c11 (pixel) of the first registered ball image 601*b* and a radius r11 (pixel) of the first registered ball B1'. Concretely, the 3D model constructing part 204 calculates beginning point coordinates b11 (xib11, yib11) of the first registered ball image 601*b* (in the camera coordinate system) and end point coordinates e11 (xie11, yie11) of the first registered ball image 601*b* (in the camera coordinate system) with using the center coordinates c11 (xic11, yic11) of the first registered ball image 601*b*, the radius r11 (pixel) of the first registered ball B1', and the following formulas (14), (15), (16) and (17).

$$xib11=xic11-r11 \quad (14)$$

$$yib11=yic11-r11 \quad (15)$$

$$xie11=xic11+r11 \quad (16)$$

$$yie11=yic11+r11 \quad (17)$$

An area surrounded between the beginning point coordinates b11 (xib11, yib11) and the end point coordinates e11 (xie11, yie11) is the first registered ball image 601*b* (ROI image). Next, the 3D model constructing part 204 converts the camera coordinate system {two-dimensional coordinates (xi11, yi11)} of the first registered ball image 601*b* of the ROI image into the world coordinate system {three-dimensional coordinates (xr11, yr11, zr11)} with using the calibration matrix information.

Here, as mentioned above, all of the z coordinate values (zr11) of the world coordinate system calculated by the calibration matrix information are of a same value on the ROI image of the first registered ball image 601*b*, therefore, the z coordinate value needs to be calculated by a different method.

The first registered ball image 601*b* is bulged into a hemispherical shape in the z-axis direction at only the radius r11 (length) of the first registered ball B1' from the center coordinates c11 (xrc11, yrc11) (length) of the first registered ball B1' three-dimensionally, and comprises a visible surface (a visible area) of the first registered ball B1' captured (seen) from the camera 10.

Then, the 3D model constructing part 204 converts a pixel of the radius r11 of the first registered ball B1' into the length of the radius r11 of the first registered ball B1', as shown in FIG. 7B, forms the visible surface 601*c* of a hemispherical first registered ball B1' toward the camera 10 with using the center coordinates c11 (xrc11, yrc11) (length) of the first registered ball image 601*b* and the radius r11 (length) of the first registered ball B1'. The 3D model constructing part 204 extends a straight line Iz projecting in the z-axis direction (toward the camera 10) from a target pixel C (xr11, yr11) (a mapped point) {in target coordinates (xr11, yr11) of the camera coordinate system} of the first registered ball image 601*b* into the formed visible surface 601*c*, and calculates the z coordinate value (zr11) of an intersection point of the straight line Iz and the visible surface 601*c*, The 3D model constructing part 204 calculates a correspondence pixel C' (xr11, yr11, zr11) of the x, y and z (three-dimensional) coordinates (xr11, yr11, zr11) of the first registered ball image 601*b* by assigning the calculated z coordinate (zr11) to the target pixel C (xr11, yr11) of x and y (two-dimensional) coordinates (xr11, yr11) converted by the calibration matrix information in the first registered ball image 601*b*. By performing the above process for all pixels of the first registered ball image 601*b*, the 3D model of the first registered ball image 601*b* is constructed (three-dimensional modeling).

In addition, the z coordinate (zr11) of the correspondence pixel C' of the first registered ball image 601*b* is calculated easily by using the center coordinates c11 (xrc11, yrc11) (length) of the first registered ball image 601*b* in the world coordinate system, the radius r11 (length) of the first registered ball B1', and the following formula (18), and adopting a positive value in two calculated values.

$$zr11=SQR[r11sup2-\{(xr11-xrc11)sup2+(yr11-yrc11)sup2\}] \quad (18)$$

When the 3D model constructing part 204 finishes constructing, a virtual rotating part 205 of the flight parameter measuring apparatus 1 rotates virtually the constructed 3D model of the first registered ball image 601*b* by using rotation parameters (e.g., a spin axis SX0 and a total spin TS0 as initial values) estimated in advance and rotation matrix information (FIG. 3, S108).

The method that the virtual rotating part 205 rotates is not particularly limited. At first, the virtual rotating part 205 uses the rotation matrix information to simulate the rotation of the 3D model. The rotation matrix information R associates three-dimensional coordinates V (xr11, yr11, zr11) of the 3D model before the rotation and a rotation parameter (SX0, TS0) with three-dimensional coordinates V' (xr11', yr11', zr11') of the 3D model after the rotation. The rotation matrix information R is expressed generally in the following formula (19).

$$V'(xr11', yr11', zr11')=R(SX0, TS0)*V(xr11, yr11, zr11) \quad (19)$$

Here, the rotation matrix information R may use a three-dimensional angle (an Eulerian angle), but the rotation matrix information R in the present invention sets a spin axis and a total spin corresponding to the three-dimensional angle.

As shown in FIG. 8A, the virtual rotating part 205 gets the three-dimensional coordinates (xr11', yr11', zr11') of the 3D model after the rotation by substituting the three-dimensional coordinates (xr11, yr11, zr11) of the 3D model before the rotation and the rotation parameter (SX0, TS0) of an initial value for the rotation matrix information R. By using the rotation matrix information R, it is possible to perform the calculation processing required for a virtual rotation once, and to simplify the processing.

When the virtual rotating part 205 finishes rotating, a registered image generating part 206 of the flight parameter measuring apparatus 1 generates a second registered ball image in the camera coordinate system obtained by converting the world coordinate system of the visible surface, captured from the camera 10 in the 3D model of the first registered ball image 601b after the rotation, into the camera coordinate system of the visible surface (FIG. 3, S109).

The method that the registered image generating part 206 generates is not particularly limited. At first, as shown in FIG. 8A, the registered image generating part 206 extracts two-dimensional coordinates of the visible surface 801a hemispherically extending in the z-axis direction toward the camera 10 from the center coordinates c11 (xrc11, yrc11) of the first registered ball B1' in the 3D model 801 (three-dimensional coordinates) of the first registered ball B1' after the rotation. The extracted visible surface 801a of the first registered ball B1' is included in a part of the second ball image 602a.

Next, the registered image generating part 206 converts the world coordinate system {three-dimensional coordinates (xr11', yr11', zr11')} of the visible surface 801a of the extracted first registered ball B1' info the camera coordinate system {two-dimensional coordinates (xi11', yi11')} of the visible surface 801a of the extracted first registered ball B1' with using the calibration matrix information. And, as shown in FIG. 8B, the registered image generating part 206 generates the converted visible surface 801a of the first registered ball B1' as a second registered ball image 801b of the camera coordinate system. In this way, it is possible to compare the second registered ball image 801b with the second ball image 602a.

When the registered image generating part 206 finishes generating, a difference calculating part 207 of the flight parameter measuring apparatus 1 calculates a difference between the generated second registered ball image 801b and the second ball image 602a (FIG. 3, S110).

The method that the difference calculating part 207 calculates is not particularly limited. The second registered ball image 801b is generated with using the first registered ball image 601b before the rotation, so the second registered ball image 801b does not correspond to all of second ball image 602a. Then, at first, as shown in FIG. 8B, the difference calculating part 207 extracts the second compared ball image 802a, corresponding to the second registered ball image 801b, in the second ball image 602a. Here, the camera coordinate system {two-dimensional coordinates (xi1', yi1')} of the second compared ball image 802a corresponds to the camera coordinate system {two-dimensional coordinates (xi2, yi2)} of the second registered ball image 801b. In this way, by generating the second registered ball image 801b based on the first registered ball image 601b corresponding to the second ball image 602a, so it is easy to compare with the second ball image 602a (the second compared ball image 802a), and it is possible to simplify the processing.

And, the difference calculating part 207 calculates a difference between the second registered ball image 801b and the second compared ball image 802a. FIG. 8B is an example indicating the second registered ball image 801b and the second compared ball image 802a. If the estimated rotation parameter generating the second registered ball image 801b coincides with a real value, the second registered ball image 801b is approximately same as the second compared ball image 802a, and the above difference becomes the minimum value. Otherwise, if the estimated rotation parameter generating the second registered ball image 801b differs from the real value, the second registered ball image 801b is completely different from the second compared ball image 802a and the above difference becomes larger. In the present invention, by comparing the second registered ball image 801b with the second compared ball image 802a, it is possible to calculate the rotation parameter with using the natural design of the surface of the ball B without using the specific logos or the like of the surface of the ball B as a mark.

Here, the difference calculating part 207 calculates the subtracted value obtained by subtracting a pixel value of a pixel of the second compared ball image 802a from a pixel value of a pixel of the second registered ball image 801b for respective pixels, calculates a squared value obtained by squaring the calculated subtracted value for respective pixels and calculates a total value obtained by summing the calculated squared value of respective pixels as the difference. In this way, it is possible to reflect a slight variation between the second registered ball image 801b and the second compared ball image 802a in the difference, and to calculate the rotation parameter of the ball B accurately.

In addition, in the above case, the difference calculating part 207 extracts the second compared ball image 802a and calculates the difference between the second registered ball image 801b and the second compared ball image 802a. To simplify the processing, the difference calculating part 207 may compare the second ball image 602a with the second registered ball image 801b as it is, and calculate the difference. Namely, even if the difference calculating part 207 calculates the difference, the difference of an area of the second ball image 602a not corresponding to the second registered ball image 801b is with an approximately constant value, so the difference of an area of the second ball image 602a corresponding to the second registered ball image 801b greatly contributes to the total difference. When the rotation parameter making the difference of the minimum value that is found easily, the difference calculating part 207 may calculate the difference between the second registered ball image 801b and the second ball image 602a.

When the difference calculating part 207 finishes calculating, a rotation parameter determining part 208 of the flight parameter measuring apparatus 1 repeats the virtual rotation of the 3D model, the generation of the second registered ball image and the calculation of the difference, and determines a rotation parameter to minimize the difference as a real rotation parameter of the ball B.

The method that the rotation parameter determining part 208 determines is not particularly limited. At first, to calculate the minimum value of the difference (FIG. 3, S111NO), the rotation parameter determining part 208 sets the difference calculated some time ago as a standard difference and changes (e.g., increases or decreases) an initial rotation parameter (the spin axis SX0 and the total spin TS0) used some time ago with only a predetermined change value (FIG. 3, S112).

Next, the rotation parameter determining part 208 rotates virtually the 3D model of the first registered ball image 601b by using the changed rotation parameter and the rotation matrix information through the virtual rotating part 205 (FIG. 3, S108).

And, the rotation parameter determining part 208 generates the second registered ball image in the camera coordinate system obtained by converting the world coordinate system of the visible surface, captured from the camera 10 in the 3D model of the first registered ball image 601b after the rotation, into the camera coordinate system through the registered image generating part 206 (FIG. 3, S109).

Further, the rotation parameter determining part 208 calculates a now difference between the generated second registered ball image and the second ball image 602a (the second compared ball image) through the difference calculating part 207 (FIG. 3, S110).

The rotation parameter determining part 208 sets the new difference as a compared difference, compares the compared difference with the standard difference and determines a difference which is smaller as a temporary difference (FIG. 3, S111).

Here, if the compared difference is the temporary difference, it is possible to determine that the second rotation parameter, increased by the change value than the initial rotation parameter, makes the difference small. Therefore, to calculate the minimum value of the difference (FIG. 3, S111NO), the rotation parameter determining part 208 calculates the third rotation parameter increased by the change value more than the second rotation parameter (FIG. 3, S112) and calculates a new compared difference through S108, S109 and S110. In this case, the temporary difference calculated by the second rotation parameter becomes the standard difference and the new compared difference of the third rotation parameter becomes the compared difference.

Otherwise, if the standard difference is the temporary difference, it is possible to determine that the initial rotation parameter rather than the second rotation parameter makes the difference small. Therefore, to calculate the minimum value of the difference (FIG. 3, S111NO), this time, the rotation parameter determining part 208 sets the standard difference calculated with the initial rotation parameter, calculates third rotation parameter decreased by the change value less than the initial rotation parameter (FIG. 3, S112) contrary to the previous change and calculates a new compared difference through S108, S109 and S110. In this case, the temporary difference calculated by the initial rotation parameter becomes the standard difference and the new compared difference of the third rotation parameter becomes the compared difference.

In this way, the rotation parameter determining part 208 repeats S108, S109 and S110, re-changes (increases or decreases) the changed rotation parameter by the change value, and performs convergence arithmetic operation so that the calculated difference can become the minimum value. For example, the optimization method to perform convergence arithmetic operation can use the least square method, the Gauss Newton method of the nonlinear least square method.

About the termination of the convergence arithmetic operation, for example, when it is determined if the standard difference is small after it is determined repeatedly if the compared difference is small, it is possible to determine that the Nth rotation parameter (the Nth spin axis SXn, the Nth total spin TSn) calculating the standard difference makes the difference the minimum value. Otherwise, when it is determined if the compared difference is small after it is determined repeatedly if the standard difference is small, it is possible to determine that the Nth rotation parameter (the Nth spin axis SXn, the Nth total spin TSn) calculating the compared difference makes the difference the minimum value. In addition, the termination of the convergence arithmetic operation may be appropriately set by the kind of the optimization method.

By the way, as a result of the repetition, when the calculated difference becomes the minimum value (FIG. 3, S111YES), the rotation parameter decision part 208 determines the rotation parameter (SXn, TSn) to minimize the difference as a real rotation parameter (spin axis SX, total spin TS) of the ball B (FIG. 3, S113).

When the rotation parameter decision part 208 finishes determining, a flight parameter displaying part 209 of the flight parameter measuring apparatus 1 displays the motion parameter (ball speed BS, launch angle LA and side angle SA) of the ball B by the motion parameter calculating part 202 and the rotation parameter (spin axis SX, total spin TS) of the ball B by the rotation parameter decision part 208 at a predetermined display part (FIG. 3, S114).

The method that the flight parameter displaying part 209 displays is not particularly limited. For example, the flight parameter displaying part 209 may display at the display part previously set to the flight parameter measuring apparatus 1 or display at the player's terminal apparatus (liquid crystal display) being communicable in radio with the flight parameter measuring apparatus 1. In this way, the player can know the flight parameter of the ball B own launched.

In this way, the measurement of the flight parameter of the ball B finishes. The player checks the flight parameter of the ball B his launched and puts a new ball B beside the flight parameter measuring apparatus 1. The flight parameter measuring apparatus 1 comes back S101.

By the way, the present invention determines the rotation parameter to minimize the difference between the second registered ball image 801b and the second ball image 602a (the second compared ball image 802a), therefore, to improve the measurement accuracy of the rotation parameter, the constitution of the second registered ball image 801b and the second ball image 602a is extremely important.

Here, the second registered ball image 801b, caused by the generation of the first registered ball image 601b, and the second ball image 602a are obtained by capturing the ball B flying in different space and different timing, so the reflectance of light from the ball B to the camera 10 is not constant about each of the first registered ball image 601b and the second ball image 602a.

Then, the present invention may comprise furthermore an image processing part 210 normalizing a ball image for each of the first registered ball image 601b and the second ball image 602a by Retinex processing, detecting (extracting) a ball structure indicating a characteristic structure of a whole surface of the ball from the normalized normalizing ball image by binarization processing, detecting (extracting) a special feature indicating a local characteristic on the ball from the normalizing ball image by patch binarization processing, and re-constructing a ball image obtained by composing the ball structure and the special feature.

Here, as shown in FIG. 9A, the re-construction of the ball image of the image processing part 210 has three processing of (1) Normalizing by Retinex processing, (2) Defecting Ball Structure, and (3) Detecting Special Feature. It is understood that the first registered ball image 901b re-constructing the first registered ball image 601b by the image processing part 210 expresses only a characteristic image. In this way, it is possible to improve the measurement accuracy of the rotation parameter.

The Retinex processing means a processing modeling a sight of a person, considering peripheral pixels to the four ends of the target pixel and correcting the pixel value of the target pixel. Although the registered ball image 601b and the second ball image 602a express the ball B in different space and different timing, the reflectance of the light and the luminosity of ball B in different space are equalized by the Retinex processing, and it is possible to generate the image expressing the ball B in same space. In this way, it is easy to calculate the difference between the second registered ball image 801b and the second ball image 602a.

The normalizing ball image by the Retinex processing comprises of a ratio (a strength ratio) between a pixel value and the mean pixel value of the peripheral pixels. The ratio L (x, y) {in coordinates (x, y)} of the target pixel of the normalizing ball image can be calculated easily with using the pixel value I (x, y) {in coordinates (x, y)} of the ball image in the specific camera coordinates (x, y), the pixel value (I*G ∂) (x, y) of the peripheral pixels of the target pixel operating a filter to make a senility image, and the following formula (20).

$$L(x, y)=I(x, y)/(I*G\partial)(x, y) \quad (20)$$

Here, for example, the filter is a smoothing filter, a Gaussian filter or the like.

The whole surface of the ball B has various concavities-convexities. For example, a golf ball has many dimples on the whole surface, a soccer ball has many pentagons and hexagons on the whole surface and a baseball and a tennis ball have many seams on the whole surface. The image processing part 210 smooths a pixel having a small pixel value by performing the binarization processing to the normalizing ball image and emphasizes a pixel having a big pixel value. Namely, a gradation in the normalizing hall image is emphasized and a dark area becomes the ball structure. In this way, it is possible to distribute a characteristic of the whole surface of the ball B and a background.

Here, for example, the binarization processing assigns "1" (white) to the target pixel when the pixel value of the target pixel is a predetermined threshold or more than the threshold, or assigns "0" (black) to the target pixel when the pixel value of the target pixel is less than the threshold. For example, the threshold may be set the value being common to all pixels of the normalizing ball image or may be set the value being different a respective plural area obtained by dividing the normalizing ball image info the plural area. The binarization processing includes an outline detecting processing tracking an edge of the target pixel assigned "0" (black), detecting an adjacent pixel to be the closest to the target pixel and finding a connection part of the target pixel. For example, the online detecting processing can be a Sobel processing, a Canny processing or an EDPF (Edge Draw Parameter Free) processing or the like. The Sobel processing is a filter processing calculating a primary spatial differential from the normalizing ball image and detecting an edge of the normalizing ball image based on a primary spatial differential. The Canny processing is an algorithm removing a noise of the normalizing ball image, finding a luminance gradient of the normalizing ball image after the removement of the noise, removing an unrelated pixel for the edge comprised of the luminance gradient and performing the binarization processing to an image removing an unrelated pixel by a hysteresis using two thresholds. The EDPF processing is an application of an ED processing and is a processing to dispense with the setting of the parameter necessary for the ED processing. The ED processing is an algorithm running real time, removing an image of the no-edge and generating an edge map from the normalizing ball image.

The surface of the ball B has a break, a wound, the logo (mark) of the manufacturer in local (partial). The image processing part 210 performs the patch binarization processing to the normalizing ball image, emphasizes a pixel of consecutive areas partially and smooths a pixel of other areas. In this way, it is possible to detect the special feature of the surface of the ball B. Here, patch binarization processing is a binarization processing setting the threshold to respective pixels.

The action effect of the re-construction of the ball image by the image processing part 210 will be explained. As shown in FIG. 9B, when there is not the re-construction of the ball image by the image processing part 210, the gradation of the first registered ball image 601b and the second ball image 602a are variation, the change for the difference between the second registered ball image and the second ball image is easy to become small and it is hard to find the minimum value. Otherwise, when there is the re-construction of the ball image by the image processing part 210, the gradation of the first registered ball image 901b and the second ball image 902a are clear, the change for the difference between the second registered ball image and the second ball image is easy to become big and it is easy to find the minimum value. Then, it is possible to simplify the processing by the re-construction of the ball image of the image processing part 210, it is easy to find the minimum value of the difference and it is possible to improve the measurement accuracy of the rotation parameter.

In addition, for example, in S106, when the first registered ball image is generated, the image processing part 210 re-constructs the first registered ball image and the second registered ball image, the 3D model of the re-constructed first registered ball image is constructed and later processing goes smoothly.

EXAMPLES

The present invention will be explained below according to Examples, etc., and does not limit by there.

At first, we produced a flight parameter measuring apparatus 1 experimentally based on FIG. 1-FIG. 3, set the flight parameter measuring apparatus 1 as Example, and measured a flight parameter of a golf ball B which a golf robot launched with using Example. As shown in FIG. 10A, we put the golf ball B on the tee of Golf practice range, put a commercial flight parameter measuring apparatus 10 on the right side of the golf ball B and put the flight parameter measuring apparatus 1 in the present invention on the left side of the golf ball B. Here, the commercial flight parameter measuring apparatus 10 is an existing product to measure a flight parameter accurately. And, when the golf robot launched the golf ball B with a golf club E, the commercial flight parameter measuring apparatus 10 and the flight parameter measuring apparatus 1 in the present invention measured a flight parameter of the golf ball B at the same time. The golf robot was adopted to lose the error by the habit of the shot and launched the golf ball B with the golf club E on various conditions (swing speed, launch direction, launch angle). We inspected a measurement accuracy of the flight parameter measuring apparatus 1 by showing graphically a measurement result each of the commercial flight parameter measuring apparatus 10 and the flight parameter measuring apparatus 1 in the present invention.

Figure 11A:
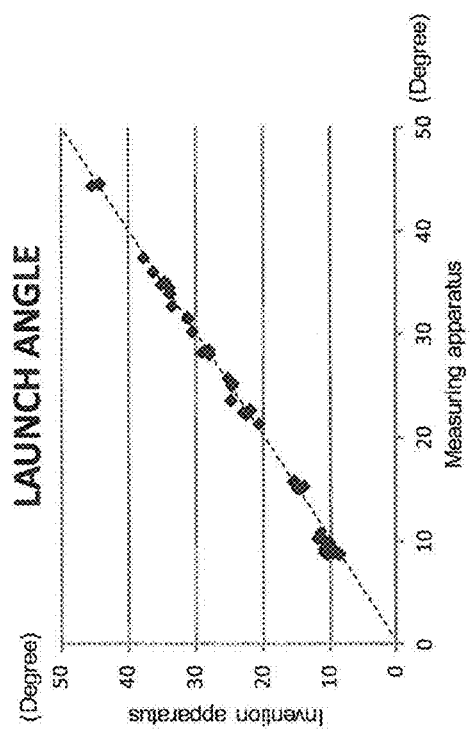
FIG. 11A is a graph of a measurement result of launch angles of the golf ball by using the commercial flight parameter measuring apparatus and the flight parameter measuring apparatus according to the present invention.
Figure 11B:
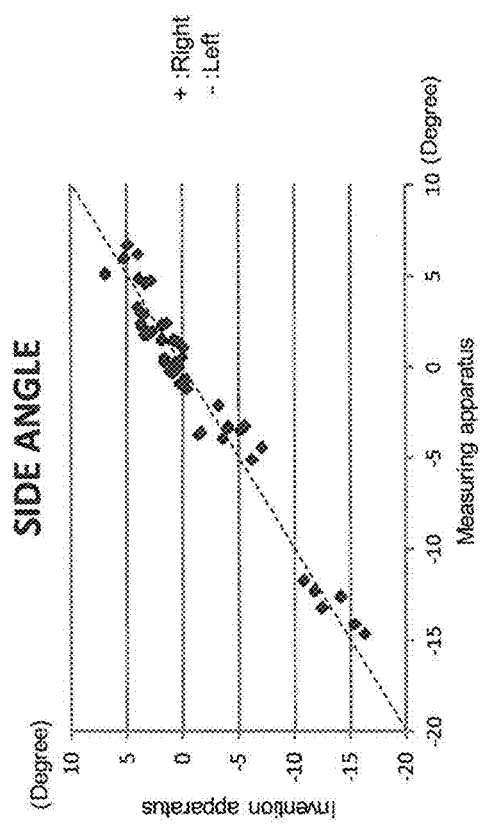
FIG. 11B is a graph of a measurement result of side angles of the golf ball by using the commercial flight parameter measuring apparatus and the flight parameter measuring apparatus according to the present invention.

As the result, as shown in FIG. 10B, the speed of the golf ball B measured by the flight parameter measuring apparatus 1 in the present invention coincided approximately with the speed of the golf ball B measured by commercial flight parameter measuring apparatus 10. As shown in FIG. 11A, the launch angle of the golf ball B measured by the flight parameter measuring apparatus 1 in the present invention coincided approximately with the launch angle of the golf ball B measured by commercial flight parameter measuring apparatus 10, too. As shown in FIG. 11B, the side angle of the golf ball B measured by the flight parameter measuring apparatus 1 in the present invention coincided approximately with the side angle of the golf ball B measured by commercial flight parameter measuring apparatus 10, too.

Figure 12A:
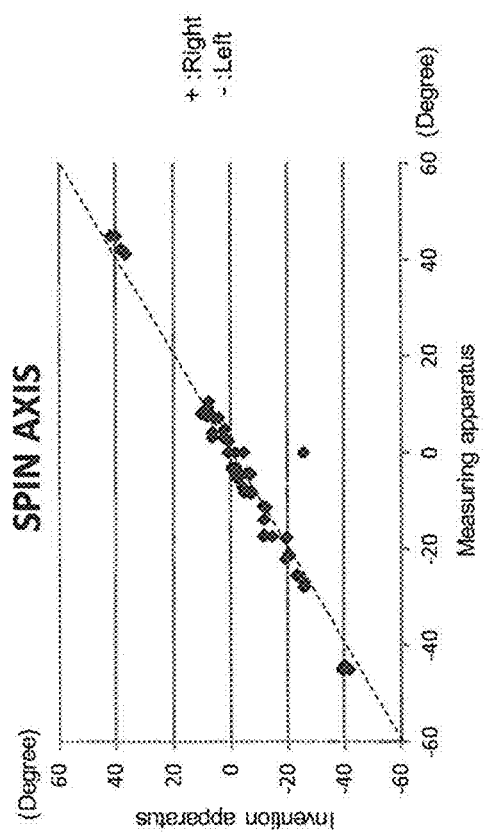
FIG. 12A is a graph of a measurement result of spin axes of the golf ball by using the commercial flight parameter measuring apparatus and the flight parameter measuring apparatus according to the present invention.
Figure 12B:
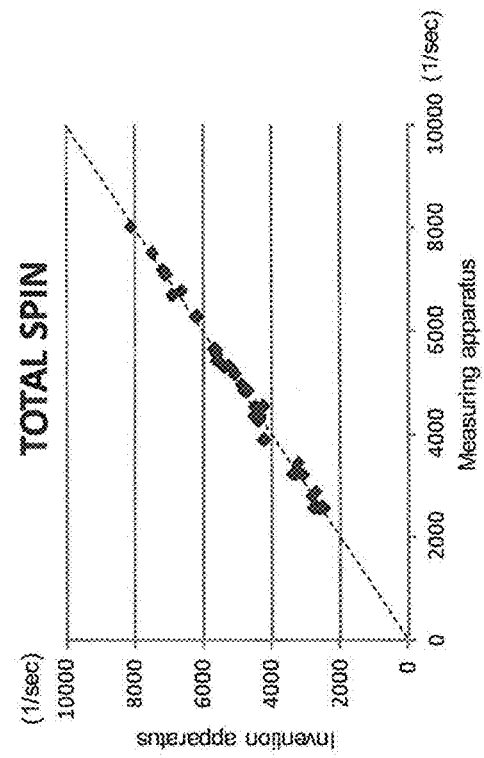
FIG. 12B is a graph of a measurement result of total spins of the golf ball by using the commercial flight parameter measuring apparatus and the flight parameter measuring apparatus according to the present invention.

Surprisingly, as shown in FIG. 12A, the spin axis of the golf ball B measured by the flight parameter measuring apparatus 1 in the present invention coincided approximately with the spin axis of the golf ball B measured by commercial flight parameter measuring apparatus 10, too. And, as shown in FIG. 12B, the total spin of the golf ball B measured by the flight parameter measuring apparatus 1 in the present invention coincided approximately with the total spin of the golf ball B measured by commercial flight parameter measuring apparatus 10, too. Therefore, we understood that the flight parameter measuring apparatus 1 in the present invention can measure accurately the flight parameters of the ball by a simple image processing method.

In addition, the embodiment of the present invention corresponds the first ball image to the second ball image, not only this, corresponds the second ball image to the first ball image and gets the same action effect. The embodiment of the present invention was explained the flight parameter measuring apparatus 1 corresponding to the golf ball B, it is not necessary to limit it to this. The present invention can be adopted widely to an apparatus or a method to measure a flight parameter of a ball such as baseball, tennis, soccer, rugby, ice hockey, gate ball, ball game to launch (fly) a ball B or the like.

In the embodiment of the present invention, the flight parameter measuring apparatus 1 is configured to include each unit, but it may be configured that a program for materializing the units is stored in a storage medium and the storage medium is provided. In such configuration, the program is read on the apparatus materializes the respective units. In this case, the program read from the storage medium provides the effect of the present invention. Additionally, the steps executed by the respective units may be stored in the hard disk.

INDUSTRIAL APPLICABILITY

As described above, the flight parameter measuring apparatus and the flight parameter measuring method are useful as an apparatus and a method for measuring a flight parameter of the ball in every ball game to fly a ball. It is effective as the flight parameter measuring apparatus and the flight parameter measuring method that can measure accurately the flight parameters of the ball by a simple image processing method.

REFERENCE SIGNS LIST

1 Flight parameter measuring apparatus
201 Image capturing part
202 Motion parameter calculating part
203 Image corresponding part
204 3D model constructing part
205 Virtual rotating part
206 Registered image generating part
207 Difference calculating part
208 Rotation parameter determining part
209 Flight parameter displaying part
210 Image processing part

The invention claimed is:
1. A flight parameter measuring apparatus comprising:
an image capturing processor processing part subsequently capturing images of a ball in flight after a camera that continuously captures the images of the ball in flight;
a motion parameter calculating processor processing part respectively binarizing a first capturing image captured first and a second capturing image captured second,
respectively generating a binarizing first capturing image and a binarizing second capturing image to specify an outer edge of plural objects in the first capturing image and the second capturing image,
calculating area ratios for each object by calculating a long side of each object for respective plural objects specified in each outer edge in each of the binarizing first capturing image and the binarizing second capturing image,
calculating a first area of a circle of each object, each calculated long side being a diameter of each circle, and a second area of the outer edge of each object in each of the binarizing first capturing image and the binarizing second capturing image, and
calculating an area ratio obtained by dividing the first area of the circle by the second area of the outer edge of the object for the plural objects in the binarizing first capturing image and the binarizing second capturing image,
specifying a first ball image having an area ratio being nearest to 1 among the calculated area ratios of the plural objects in the binarizing first capturing image,
specifying a second ball image having an area ratio being nearest to 1 among the calculated area ratios of the plural objects in the binarizing second capturing image,
calculating center coordinates and a radius of the specifying first ball image in the binarizing first capturing image in a camera coordinate system, and
calculating center coordinates and a radius of the specifying second ball image in the binarizing second capturing image in the camera coordinate system;
an image corresponding processor processing part generating a first registered ball image obtained by translating the center coordinates of the specifying first ball image in the first capturing image to the center coordinates of the specifying second ball image in the second capturing image in the camera coordinate system, and multiplying the translated first ball image by a size ratio, the size ratio obtained by dividing the radius of the second ball image by the radius of the first ball image;
a 3D model constructing processor processing part constructing a 3D model of the first registered ball image obtained by converting camera coordinates of the first registered ball image in the camera coordinate system into world coordinates of the first registered ball image in a world coordinate system using calibration matrix information, converting a pixel of the radius of the first registered ball image into a length of the radius of the first registered ball image, forming a first visible surface of a hemispherical first registered ball image toward the same camera using x and y center coordinates of the first registered ball image in the world coordinate system and the length of the radius of the first registered ball image, extending a straight line projecting in a z-axis direction of the world coordinate system into the first visible surface, and assigning a z coordinate, being an intersection point of the straight line and the first visible surface, to x and y coordinates of the first registered ball image in the world coordinate system;

a virtual rotating processor processing part rotating virtually the constructed 3D model of the first registered ball image by using rotation parameters estimated in advance and rotation matrix information, wherein the rotation parameters are a spin axis and a total spin, and wherein the rotation matrix information associates three-dimensional coordinates of the 3D model before the rotation and the rotation parameters with three-dimensional coordinates of the 3D model after the rotation;

a registered image generating processor processing part forming a second visible surface using the first registered ball image after the rotation in the 3D model, and generating a second registered ball image in the camera coordinate system obtained by converting world coordinates of the second visible surface, captured from the camera and in the 3D model after the rotation, into camera coordinates of the second visible surface using the calibration matrix information;

a difference calculating processor processing part extracting a second compared ball image, corresponding to the second registered ball image, in the specifying second ball image in the second capturing image, comparing the second registered ball image with the second compared ball image, and calculating a difference between the second registered ball image and the second compared ball image; and a rotation parameter determining processor processing part repeating the virtual rotation of the 3D model, the generation of the second registered ball image and the calculation of the difference, and determining the spin axis and total spin rotation parameters to minimize the calculated difference as real rotation parameters of the ball.

2. The flight parameter measuring apparatus according to claim 1, further comprising:

an image processor processing part respectively normalizing the first registered ball image and the specifying second ball image in the second capturing image by Retinex processing, detecting a ball structure indicating a characteristic structure of a whole surface of the ball from each of the normalizing first registered ball image and the normalizing second ball image by binarization processing, detecting a special feature indicating a local characteristic on the ball from each of the normalizing first registered ball image and the normalizing second ball image by patch binarization processing, and respectively re-constructing the first registered ball image and the second ball image obtained by composing the ball structure and the special feature in each of the normalized first registered ball image and the normalized second ball image, wherein the 3D model constructing processor processing part constructs the 3D model of the re-constructed first registered ball image, and wherein the difference calculating processor processing part extracts the second compared ball image in the re-constructed second ball image.

3. The flight parameter measuring apparatus according to claim 1, further comprising:

an image processor processing part respectively normalizing the first registered ball image and the specifying second ball image in the second capturing image by Retinex processing, detecting a ball structure indicating a characteristic structure of a whole surface of the ball from each of the normalizing first registered ball image and the normalizing second ball image by binarization processing, detecting a special feature indicating a local characteristic on the ball from each of the normalizing first registered ball image and the normalizing second ball image by patch binarization processing, and respectively re-constructing the first registered ball image and the second ball image obtained by composing the ball structure and the special feature in each of the normalizing first registered ball image and the normalizing second ball image, wherein the 3D model constructing processor processing part constructs the 3D model of the re-constructed first registered ball image, wherein the difference calculating processor processing part extracts the second compared ball image in the re-constructed second ball image, calculates a subtracted value obtained by subtracting a pixel value of a pixel of the second compared ball image from a pixel value of a pixel of the second registered ball image for respective pixels, calculates a squared value obtained by squaring the calculated subtracted value for respective pixels, and calculates a total value obtained by summing the calculated squared value of respective pixels as the difference, wherein the rotation parameter determining processor processing part changes an initial rotation parameter with only a predetermined change value, repeats the virtual rotation of the 3D model, the generation of the second registered ball image and the calculation of the difference, re-changes the changed rotation parameter by the change value, and performs convergence arithmetic operation so that the calculated difference can become the minimum value, and wherein the convergence arithmetic operation be used by least square method, or Gauss Newton method of nonlinear least square method.

4. The flight parameter measuring apparatus according to claim 1, wherein:

the image corresponding processor processing part estimates a pixel value I (xi11, yi11) of a target pixel of the first registered ball image in the camera coordinate system by substituting pixel values I (xi1, yi1), I (xi1+1, yi1), I (xi1+1, yi1+1) and I (xi1, yi1+1) of the peripheral pixels of the first ball image, the peripheral pixels arranged adjacently to the four ends of the target pixel of the first registered ball image for the following formulas (11), (12) and (13) below:

$$I(xi11, yi11)=I(xi1, yi1)*(1-fx)*(1-fy)+1(xi1+1, yi1)*(1-fx)*fy+1(xi1+1, yi1+1)*fx*fy+1(xi1, yi1+1)*fx*(1-fy) \quad (11),$$

$$fx=xi11-xi1 \quad (12),$$

and $$fy=yi11-yi1 \quad (13).$$

5. The flight parameter measuring apparatus according to claim 1, wherein:
   the 3D model constructing processor processing part calculates the z coordinate (zr11) of x and y coordinates (xr11, yr11) of the first registered ball image in the world coordinate system by using the center coordinates c11 (xrc11, yrc11) of the first registered ball image in the world coordinate system, the radius r11 of the first registered ball image, and the following formula (18) below:

$$zr11=SQR[r11sup2-\{(xr11-xrc11)sup2+(yr11-yrc11)sup2\}] \quad (18),$$

and adopting a positive value in two calculated values from the formula (18), and assigns the positive value of the z coordinate (zr11) to the x and y coordinates (xr11, yr11) of the first registered ball image in the world coordinate system.

6. The flight parameter measuring apparatus according to claim 1, wherein:
   the difference calculating processor processing part calculates a subtracted value obtained by subtracting a pixel value of a pixel of the second compared ball image from a pixel value of a pixel of the second registered ball image for respective pixels, calculates a squared value obtained by squaring the calculated subtracted value for respective pixels, and calculates a total value obtained by summing the calculated squared value of respective pixels as the difference,
   wherein the rotation parameter determining processor processing part changes an initial rotation parameter with only a predetermined change value, repeats the virtual rotation of the 3D model, the generation of the second registered ball image and the calculation of the difference, re-changes the changed rotation parameter by the change value, and performs convergence arithmetic operation so that the calculated difference can become the minimum value, and
   wherein the convergence arithmetic operation be used by least square method, or Gauss Newton method of nonlinear least square method.

7. The flight parameter measuring apparatus according to claim 1, wherein:
   the registered image generating processor processing part extracting the second visible surface hemispherically extending in the z-axis direction toward the camera from the center coordinates of the first registered ball image after the rotation in the 3D model, converting world coordinates of the second visible surface of the first registered ball image extracted into camera coordinates of the second visible surface using the calibration matrix information, and generating the converted world coordinates of the second visible surface as the second registered ball image in the camera coordinate system.

8. A flight parameter measuring method comprising:
   an image capturing step for subsequently capturing images of a ball in flight after a camera that continuously captures the images of the ball in flight;
   a motion parameter calculating step for respectively binarizing a first capturing image captured first and a second capturing image captured second,
   respectively generating a binarizing first capturing image and a binarizing second capturing image to specify an outer edge of plural objects in the first capturing image and the second capturing image,
   calculating area ratios for each object by calculating a long side of each object for respective plural objects specified in each outer edge in each of the binarizing first capturing image and the binarizing second capturing image,
   calculating a first area of the circle of each object, each calculated long side being a diameter of each circle, and a second area of the outer edge of each object in each of the binarizing first capturing image and the binarizing second capturing image, and
   calculating an area ratio obtained by dividing the first area of the circle by the second area of the outer edge of the object for the plural objects in the binarizing first capturing image and the binarizing second capturing image,
   specifying a first ball image having an area ratio being nearest to 1 among the calculated area ratios of the plural objects in the binarizing first capturing image,
   specifying a second ball image having an area ratio being nearest to 1 among the calculated area ratios of the plural objects in the binarizing second capturing image,
   calculating center coordinates and a radius of the specifying first ball image in the binarizing first capturing image in a camera coordinate system, and
   calculating center coordinates and a radius of the specifying second ball image in the binarizing second capturing image in the camera coordinate system;
   an image corresponding step for generating a first registered ball image obtained by translating the center coordinates of the specifying first ball image in the first capturing image to the center coordinates of the specifying second ball image in the second capturing image in the camera coordinate system, and multiplying the translated first ball image by a size ratio, the size ratio obtained by dividing the radius of the second ball image by the radius of the first ball image;
   a 3D model constructing step for constructing a 3D model of the first registered ball image obtained by converting camera coordinates of the first registered ball image in the camera coordinate system into world coordinates of the first registered ball image in a world coordinate system using calibration matrix information,
   converting a pixel of the radius of the first registered ball image into a length of the radius of the first registered ball image,
   forming a first visible surface of a hemispherical first registered ball image toward the same camera using x and y center coordinates of the first registered ball image in the world coordinate system and the length of the radius of the first registered ball image,
   extending a straight line projecting in a z-axis direction of the world coordinate system into the first visible surface, and
   assigning a z coordinate, being an intersection point of the straight line and the first visible surface, to x and y coordinates of the first registered ball image in the world coordinate system;

a virtual rotating step for rotating virtually the constructed 3D model of the first registered ball image by using rotation parameters estimated in advance and rotation matrix information, wherein the rotation parameters are a spin axis and a total spin, and wherein the rotation matrix information associates three-dimensional coordinates of the 3D model before the rotation and the rotation parameters with three-dimensional coordinates of the 3D model after the rotation;

a registered image generating step for forming a second visible surface using the first registered ball image after the rotation in the 3D model, and generating a second registered ball image in the camera coordinate system obtained by converting world coordinates of the second visible surface, captured from the camera and in the 3D model after the rotation, into camera coordinates of the second visible surface using the calibration matrix information;

a difference calculating step for extracting a second compared ball image, corresponding to the second registered ball image, in the specifying second ball image in the second capturing image, comparing the second registered ball image with the second compared ball image, and calculating a difference between the second registered ball image and the second compared ball image; and a rotation parameter determining step for repeating the virtual rotation of the 3D model, the generation of the second registered ball image, and the calculation of the difference, and determining the spin axis and total spin rotation parameters to minimize the calculated difference as real rotation parameters of the ball.

9. A flight parameter measuring apparatus comprising:

an image capturing processor processing part subsequently capturing images of a ball in flight after a camera that continuously captures the images of the ball in flight;

a motion parameter calculating processor processing part respectively binarizing a first capturing image captured first and a second capturing image captured second, respectively generating a binarizing first capturing image and a binarizing second capturing image to specify an outer edge of plural objects in the first capturing image and the second capturing image, calculating area ratios for each object by calculating a long side of each object for respective plural objects specified in each outer edge in each of the binarizing first capturing image and the binarizing second capturing image, calculating a first area of a circle of each object, each calculated long side being a diameter of each circle, and a second area of the outer edge of each object in each of the binarizing first capturing image and the binarizing second capturing image, and calculating an area ratio obtained by dividing the first area of the circle by the second area of the outer edge of the object for the plural objects in the binarizing first capturing image and the binarizing second capturing image, specifying a first ball image having an area ratio being nearest to 1 among the calculated area ratios of the plural objects in the binarizing first capturing image, specifying a second ball image having an area ratio being nearest to 1 among the calculated area ratios of the plural objects in the binarizing second capturing image, calculating center coordinates and a radius of the specifying first ball image in the binarizing first capturing image in a camera coordinate system, and calculating center coordinates and a radius of the specifying second ball image in the binarizing second capturing image in the camera coordinate system;

an image corresponding processor processing part generating a first registered ball image obtained by translating the center coordinates of the specifying first ball image in the first capturing image to the center coordinates of the specifying second ball image in the second capturing image in the camera coordinate system, and multiplying the translated first ball image by a size ratio, the size ratio obtained by dividing the radius of the second ball image by the radius of the first ball image;

a 3D model constructing processor processing part constructing a 3D model of the first registered ball image obtained by converting camera coordinates of the first registered ball image in the camera coordinate system into world coordinates of the first registered ball image in a world coordinate system using calibration matrix information, a virtual rotating processor processing part rotating virtually the constructed 3D model of the first registered ball image by using rotation parameters estimated in advance and rotation matrix information, a registered image generating processor processing part forming a visible surface using the first registered ball image after the rotation in the 3D model, and generating a second registered ball image in the camera coordinate system obtained by converting world coordinates of the visible surface, captured from the camera and in the 3D model after the rotation, into camera coordinates of the visible surface using the calibration matrix information;

a difference calculating processor processing part extracting a second compared ball image, corresponding to the second registered ball image, in the specifying second ball image in the second capturing image, comparing the second registered ball image with the second compared ball image, and calculating a difference between the second registered ball image and the second compared ball image; and a rotation parameter determining processor processing part repeating the virtual rotation of the 3D model, the generation of the second registered ball image and the calculation of the difference, and determining the spin axis and total spin rotation parameters to minimize the calculated difference as real rotation parameters of the ball.

* * * * *